(12) United States Patent
Kulick, III et al.

(10) Patent No.: US 7,491,325 B2
(45) Date of Patent: Feb. 17, 2009

(54) BIOLOGICAL TREATMENT SYSTEM AND ASSEMBLY

(75) Inventors: Frank M. Kulick, III, Lake Ariel, PA (US); Timothy E. Krell, Mohrsville, PA (US); Robert W. Hartung, Abington, PA (US); Curtis S. McDowell, Allentown, PA (US)

(73) Assignee: Brentwood Industries, Inc., Reading, PA (US)

( * ) Notice: Subject to any disclaimer, the term of this patent is extended or adjusted under 35 U.S.C. 154(b) by 31 days.

(21) Appl. No.: 11/551,538

(22) Filed: Oct. 20, 2006

(65) Prior Publication Data

US 2008/0093294 A1   Apr. 24, 2008

(51) Int. Cl.
*C02F 3/06* (2006.01)
(52) U.S. Cl. .................. 210/150; 210/541; 210/615; 261/DIG. 72
(58) Field of Classification Search .................. 210/150, 210/151, 615, 521, 541; 261/DIG. 72
See application file for complete search history.

(56) References Cited

U.S. PATENT DOCUMENTS

| | | | | |
|---|---|---|---|---|
| 3,618,778 A | * | 11/1971 | Benton et al. ............... | 210/150 |
| 3,904,525 A | * | 9/1975 | Rosenberg .................. | 210/150 |
| 4,437,988 A | * | 3/1984 | James ........................ | 210/521 |
| 4,597,916 A | * | 7/1986 | Chen .................... | 261/DIG. 72 |
| 4,599,174 A | | 7/1986 | McDowell | |
| 4,666,593 A | * | 5/1987 | Bosne ........................ | 210/150 |
| 5,326,475 A | * | 7/1994 | Kent .......................... | 210/615 |
| 5,384,178 A | * | 1/1995 | Rye .................... | 261/DIG. 72 |
| 5,389,247 A | * | 2/1995 | Woodside ................... | 210/151 |
| 5,545,327 A | * | 8/1996 | Volland ...................... | 210/615 |
| 5,771,716 A | | 6/1998 | Schlussel | |
| 6,280,819 B1 | * | 8/2001 | McKeigue et al. ... | 261/DIG. 72 |
| 6,544,628 B1 | | 4/2003 | Aull et al. | |
| 6,811,700 B2 | | 11/2004 | Austin et al. | |
| 6,869,534 B2 | | 3/2005 | McDowell et al. | |
| 6,878,280 B2 | | 4/2005 | McDowell et al. | |
| 6,942,788 B1 | * | 9/2005 | Cox et al. ................... | 210/151 |
| 7,083,324 B2 | | 8/2006 | Van Drie | |

* cited by examiner

*Primary Examiner*—Christopher Upton
(74) *Attorney, Agent, or Firm*—Panitch Schwarze Belisario & Nadel LLP

(57) ABSTRACT

An assembly for supporting biomass for treating sludge or wastewater includes a first corrugated sheet having crests and valleys, a second corrugated sheet having crests and valleys and an intermediate member mounted between the first and second corrugated sheets. The crests have peak surfaces and the valleys have trough surfaces. The first corrugated sheet has a first longitudinal axis and the second corrugated sheet has a second longitudinal axis. The corrugations of the first corrugated sheet define a first corrugation angle of about zero degrees (0°) to about forty-five degrees (45°) relative to the first longitudinal axis and the corrugations of the second corrugated sheet define a second corrugation angle of about zero degrees (0°) to about forty-five degrees (45°) relative to the second longitudinal axis. The second corrugated sheet is mounted to the first corrugated sheet and the intermediate member has openings therein.

15 Claims, 12 Drawing Sheets

BIOLOGICAL TREATMENT SYSTEM AND ASSEMBLY

BACKGROUND OF THE INVENTION

The present application is directed to a biological treatment system and an assembly for supporting biomass derived from bacteria present in or seeded into the sludge or wastewater for treating the sludge or wastewater. More particularly, the present application is directed to an assembly of generally structural corrugated sheets and generally non-structural intermediate members mounted between pairs of the corrugated sheets wherein the corrugated sheets, when bonded together, provide structural support for the assembly. The assembly typically includes multiple corrugated sheets with an intermediate member preferably sandwiched between each of the corrugated sheets of the assembly.

Treating sludge and wastewater by passing the sludge and wastewater through media having a relatively large surface area with a biomass growing thereon to remove ammonia nitrogen ($NH_3$—N) or other such contaminants from and to reduce the biochemical oxygen demand (BOD) of the sludge and wastewater is known. For example, U.S. Pat. No. 4,599,174 ('174 patent), which is incorporated herein by reference in its entirety, discloses a fixed-film biological distribution system wherein contaminated waste is biologically digested by microorganisms retained on corrugated packings or media. The media are typically constructed of structural sheets with bacteria growing thereon, such as is disclosed in the '174 patent, or a non-structural textile material that is mounted to a heavy and relatively expensive stainless steel support structure for immersion in the sludge and wastewater. The sludge and wastewater is exposed to the bacteria growing on the surfaces of the media, which biologically treats the sludge and wastewater, either aerobically, anoxically or anaerobically, depending upon the type of well-known bacteria used in the system.

The non-structural fabric or textile material usually includes multiple loops to increase the surface area for bacteria growth and is typically more efficient in supporting the biomass for treating the sludge and wastewater when compared to the structural sheet material. However, the non-structural fabric or textile material is typically mounted to a relatively high-cost and heavy stainless steel mounting structure. In contrast, the structural sheet material is less efficient in treating the sludge and wastewater than the non-structural fabric or textile material but is comparatively light and less expensive than the stainless steel support structure. In addition, the stainless steel support structure provides little or no surface area for growth of the treatment bacteria. One non-limiting example of a suitable fabric or textile sheet having multiple loops is disclosed in U.S. Pat. No. 5,771,716, the disclosure of which is hereby incorporated by reference.

It would be desirable to construct a sludge and wastewater treatment medium having both the advantages of the structural sheet material and the non-structural fabric or textile material in an individual assembly. Specifically, it would be desirable to construct a sludge and wastewater treatment medium having a relatively low cost, a lightweight and having a high relatively efficiency in treating the sludge and wastewater. The present invention generally provides these advantages.

BRIEF SUMMARY OF THE INVENTION

A preferred embodiment of the present invention is directed to an assembly for supporting biomass for treating sludge or wastewater including a plurality of first and second corrugated sheets and a plurality of intermediate members having openings therein. The intermediate member is mounted between at least one of the plurality of first corrugated sheets and at least one of the plurality of second corrugated sheets. Each of the first corrugated sheets has crests and valleys. The crests have peak surfaces and the valleys have trough surfaces. Each of the first corrugated sheets has a plurality of projections extending outward from the peak surfaces of the crests and a plurality of depressions formed in the trough surfaces of the valleys. The first corrugated sheets have a first longitudinal axis and a first transverse axis. Each of the second corrugated sheets has crests with peak surfaces and valleys with trough surfaces. Each of the plurality of second corrugated sheets has a plurality of projections extending outward from the peak surfaces of the crests and a plurality of depressions formed in the trough surfaces of the valleys. The second corrugated sheets have a second longitudinal axis and a second transverse axis. The projections of the second corrugated sheets are disposed within the openings in the intermediate member and extend into mating depressions of the first corrugated sheets to retain the intermediate member between the first and second corrugated sheets.

In another aspect, a preferred embodiment of the present invention is directed to an assembly for supporting biomass for treating sludge or wastewater including a first corrugated sheet having crests and valleys, a second corrugated sheet having crests and valleys and an intermediate member mounted between the first and second corrugated sheets. The crests have peak surfaces and the valleys have trough surfaces. The first corrugated sheet has a first longitudinal axis and the second corrugated sheet has a second longitudinal axis. The corrugations of the first corrugated sheet define a first corrugation angle of about zero degrees (0°) to about forty-five degrees (45°) relative to the first longitudinal axis and the corrugations of the second corrugated sheet define a second corrugation angle of about zero degrees (0°) to about forty-five degrees (45°) relative to the second longitudinal axis. The second corrugated sheet is typically mounted to the first corrugated sheet after the intermediate member. The intermediate member typically has openings therein that are placed around projections on the peak surfaces of the first corrugated sheet and the projections are engaged with depressions of the second corrugated sheet. The intermediate member is sandwiched or trapped between the first and second corrugated sheets to distribute the load generated on the intermediate member to multiple load points or projections on the corrugated sheets.

In a further aspect, a preferred embodiment of the present invention is directed to a biological treatment system for removal of ammonia nitrogen from and/or reduction of the BOD of sludge or wastewater including a basin having at least one of the sludge and wastewater therein and a first media tower positioned within the basin. The basin includes an inlet, an outlet and a basin axis. The first media tower defines a tower plane transverse to the basin axis and is generally impervious to fluid flow perpendicular to the tower plane. The first media tower includes a plurality of intermediate members, each of which is mounted between a pair of corrugated sheets. The first media tower includes a base edge, a top edge and a plurality of flow channels extending from the base edge to the top edge. The flow channels are defined by spaces between the plurality of intermediate members and the corrugated sheets. The sludge or the wastewater that moves along each of the flow channels is exposed to at least portions of the surfaces of the corrugated sheets and to surfaces of at least one of the intermediate members.

BRIEF DESCRIPTION OF THE SEVERAL VIEWS OF THE DRAWINGS

The foregoing summary, as well as the following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
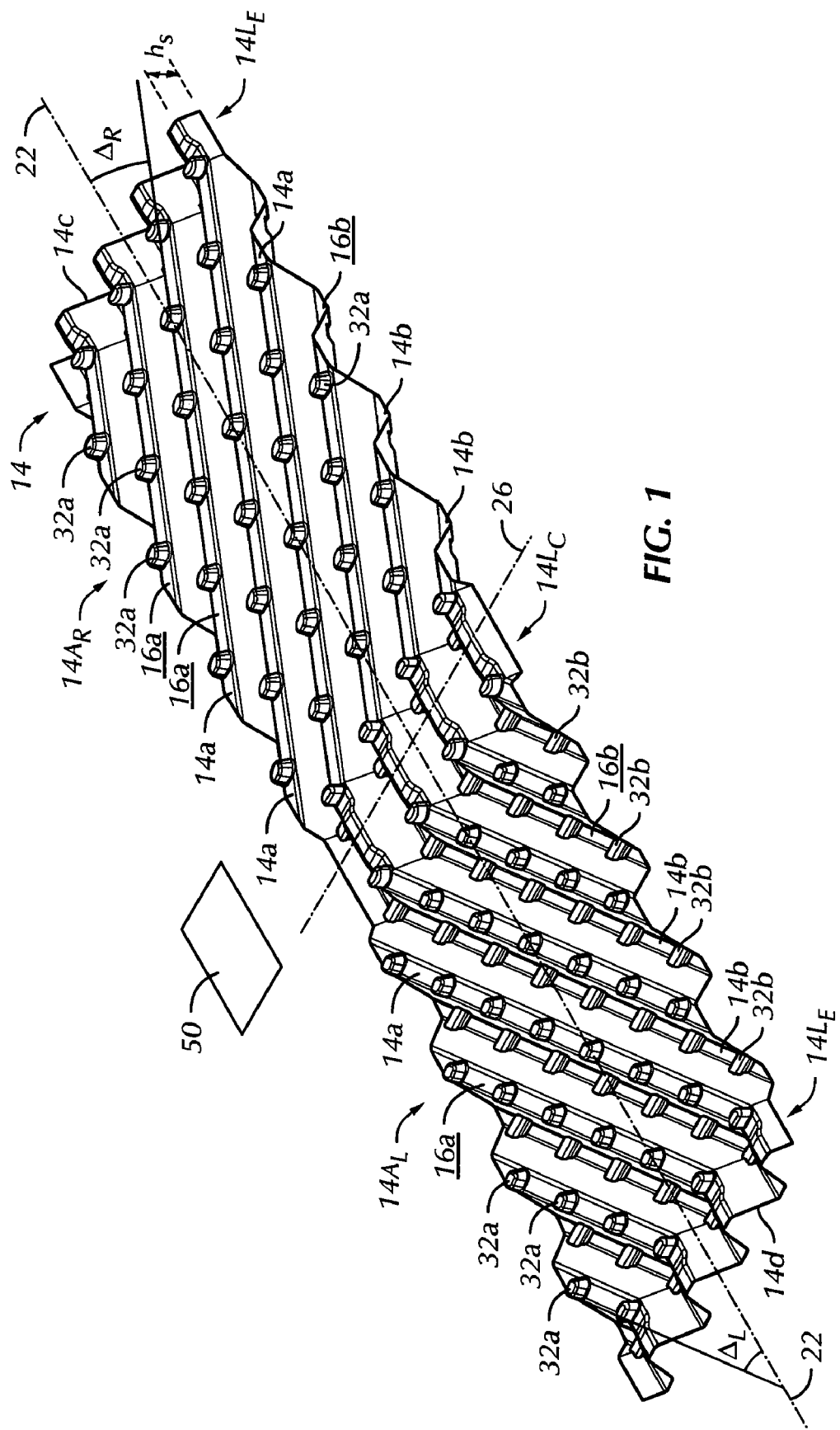
FIG. 1 is a top isometric view of a portion of a first corrugated sheet for a biological treatment assembly in accordance with a preferred embodiment of the present application.

Certain terminology is used in the following description for convenience only and is not limiting. The words "right", "left", "lower", "upper", "top" and "bottom" designate directions or orientations in the drawings to which reference is made. The words "inwardly" and "outwardly" refer to directions toward and away from, respectively, the geometric center of the biological treatment system, the biological treatment assembly and designated parts thereof. The terminology includes the above-listed words, derivatives thereof and words of similar import.

Referring to the drawings in detail, wherein like numerals indicate like elements throughout, there is shown in FIGS. 1-10A, a preferred embodiment of an assembly for supporting biomass for treating sludge or wastewater 10 and a biological treatment system 12 for at least one of removal of ammonia nitrogen from and reduction of the BOD of the sludge or wastewater 10, in accordance with the present invention.

Referring to FIGS. 1-6 and 10, in the preferred embodiment, the assembly for supporting biomass for treating the sludge or wastewater 10 includes a first corrugated sheet 14 having crests 14a and valleys 14b. The first corrugation sheet 14 is preferably constructed of a synthetic polymeric material, such as a thermoformed polyvinyl chloride (PVC) sheet having generally parallel ridges that define the crests 14a and grooves that define the valleys 14b. The crests 14a have peak surfaces 16a and the valleys 14b have trough surfaces 16b, respectively. The first corrugated sheet 14 is not limited to having the generally parallel ridges and grooves defining the crests 14a and the valleys 14b or to being constructed of the thermoformed PVC material. The first corrugated sheet 14 may be constructed of nearly any material and may have nearly any configuration and/or shape that includes features that may be considered the crests 14a having peak surfaces 16a and the valleys 14b having the trough surfaces 16b, is able to perform the typical functions of the first corrugated sheet 14 and is able to withstand the normal operating conditions of the first corrugated sheet 14, as will be described in greater detail below. The first corrugated sheet 14 includes the crests 14a and valleys 14b such that the sludge or wastewater 10 may flow along the surfaces of the first corrugated sheet 14 within the spaces between and within the crests 14a and valleys 14b. In addition, the first corrugated sheet 14 is preferably constructed of the PVC material due to the relatively low cost and manufacturability of the material, the corrosion resistance of the material and the ability to readily form the material into a sheet that has desirable structural qualities for the preferred application.

Figure 1A:
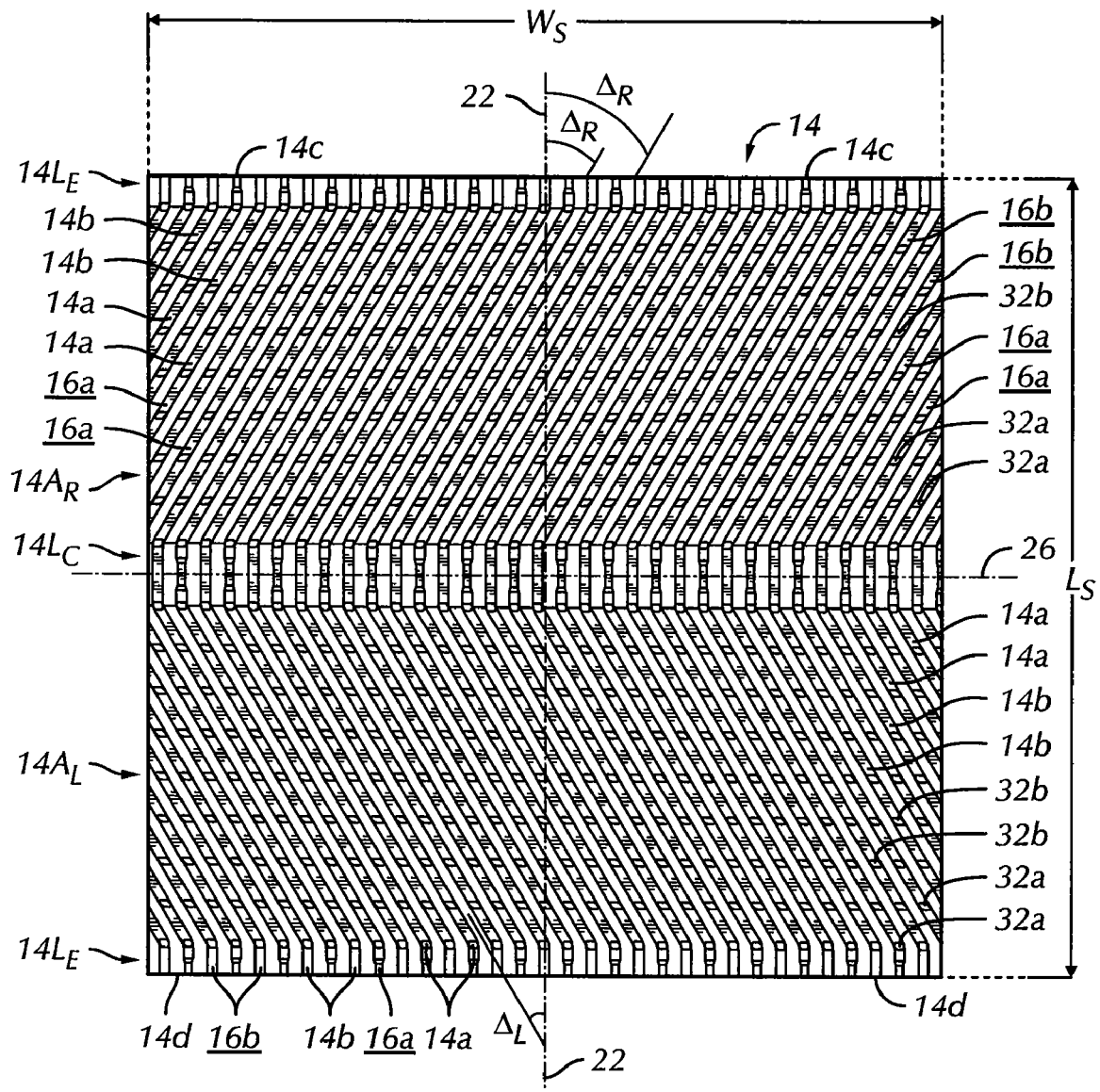
FIG. 1A is a top plan view of the first corrugated sheet, a portion of which is shown in FIG. 1, wherein some of the projections and depressions are not shown on the left side of the first corrugated sheet for clarity.

Referring to FIGS. 1 and 1A, the first corrugated sheet 14 has a first longitudinal axis 22. The corrugations, typically defined by the crests 14a and valleys 14b of the first corrugated sheet 14 define a first corrugation angle $\Delta_R$, $\Delta_L$ of about zero degrees (0°) to about forty-five degrees (45°) relative to the first longitudinal axis 22. Orienting the corrugations of the first corrugated sheet 14 relative to the longitudinal axis 22 at the first corrugations angle $\Delta_R$, $\Delta_L$ of about zero degrees to about forty-five degrees provides stiffness to the first corrugated sheet 14 along the first longitudinal axis 22 and strength to the first corrugated sheet 14 in the direction of the corrugations defined by the first corrugation angle $\Delta_R$, $\Delta_L$ and the first longitudinal axis 22.

The preferred first corrugation angle $\Delta_R$, $\Delta_L$ is about thirty degrees (30°). Referring specifically to FIG. 1A, in the preferred embodiment, the corrugations of the first corrugated sheet 14 include at least right-hand angled corrugations $14A_R$ and left-hand angled corrugations $14A_L$ or corrugations that extend toward a top edge $14c$ and to the right of the first longitudinal axis $22$ and toward the top edge $14c$ and to the left of the first longitudinal axis $22$, respectively. Accordingly, the first corrugated sheet $14$ preferably includes right-hand first corrugation angles $\Delta_R$ and left-hand first corrugations angles $\Delta_L$, respectively. The first corrugated sheet $14$ is not limited to including both the right-hand and left-hand angled corrugations $14A_R$, $14A_L$ or to having corrugations that form any specific corrugation angle relative to the first longitudinal axis $22$ and may have corrugations that are positioned on and traverse the first corrugated sheet $14$ in nearly any manner that permits movement of the sludge and wastewater $10$ relative to and within spaces created between the corrugations, as will become apparent to one having ordinary skill in the art upon reviewing the present disclosure.

Figure 2:
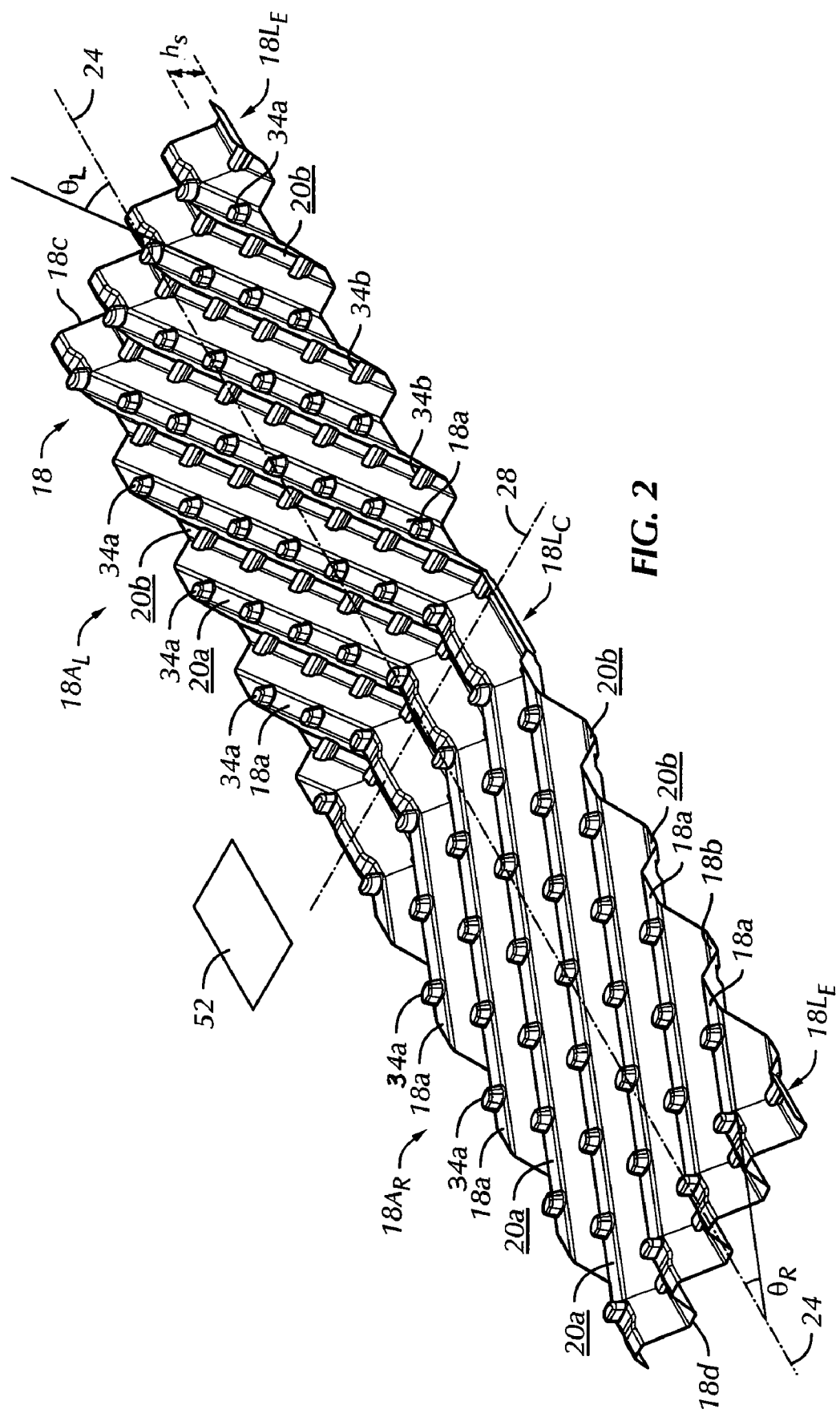
FIG. 2 is a top isometric view of a portion of a second corrugated sheet for the biological treatment assembly in accordance with the preferred embodiment of the present application.
Figure 2A:
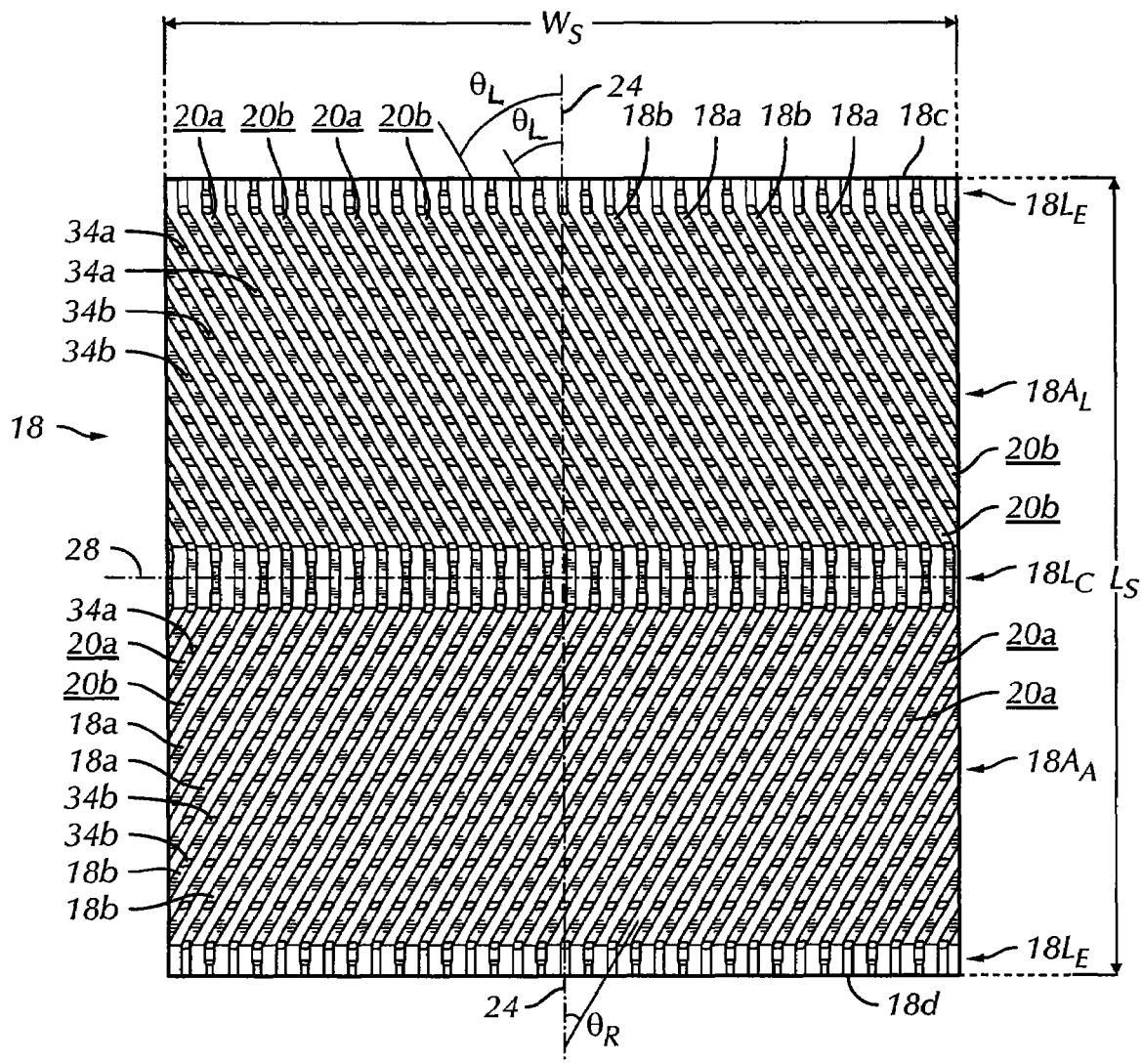
FIG. 2A is a top plan view of the second corrugated sheet, a portion of which is shown in FIG. 2, wherein some of the projections and depressions are not shown on the right side of the second corrugated sheet for clarity.

Referring to FIGS. 2 and 2A, a second corrugated sheet $18$ also includes crests and valleys $18a$, $18b$, wherein the crests $18a$ have peak surfaces $20a$ and the valleys $18b$ have trough surfaces $20b$. The second corrugated sheet $18$ includes a second longitudinal axis $24$ and the corrugations of the second corrugated sheet $18$ define a second corrugation angle $\Theta R$, $\Theta_L$ of about zero degrees (0°) to forty-five degrees (45°) relative to the second longitudinal axis $24$. The corrugations of the second corrugated sheet $18$ are preferably defined by the crests $18a$ and the valleys $18b$ and are preferably comprised of generally parallel oriented and generally evenly spaced corrugations or crests and valleys $18a$, $18b$, similar to the crests $14a$ and valleys $14b$ of the first corrugated sheet $14$. In the preferred embodiment, the second corrugated sheet $18$ is constructed in a similar manner with a similar or the same material as the first corrugated sheet $14$ and has a generally complimentary second corrugation angles $\Theta_R$, $\Theta_L$ relative to the first corrugation angle $\Delta_R$, $\Delta_L$ such that when the first corrugated sheet $14$ is mounted to the second corrugated sheet $18$, a cross-corrugation pattern is formed, as will be described in greater detail below.

The preferred second corrugation angle $\Theta_R$, $\Theta_L$ is about thirty degrees (30°). Referring specifically to FIG. 2A, in the preferred embodiment, the corrugations of the second corrugated sheet $18$ include at least right-hand angled corrugations $18A_R$ and left-hand angled corrugations $18A_L$ or corrugations that extend toward the a top edge $18c$ and to a right of the second longitudinal axis $24$ and toward the top edge $18c$ and to a left of the second longitudinal axis $24$, respectively. Accordingly, the second corrugated sheet $18$ preferably includes right-hand second corrugation angles $\Theta_R$ and left-hand second corrugations angles $\Theta_L$, respectively. The second corrugated sheet $18$ is not limited to including both the right-hand and left-hand angled corrugations $18A_R$, $18A_L$ or to having corrugations that form any specific corrugation angle relative to the second longitudinal axis $24$ and may have corrugations that are positioned on and traverse the second corrugated sheet $18$ in nearly any manner that permits movement of the sludge and wastewater $10$ relative to and within spaces created between the corrugations, as will become apparent to one having ordinary skill in the art upon reviewing the present disclosure.

Referring to FIGS. 1-6, in the preferred embodiment, the first and second corrugated sheets $14$, $18$ include a top edge $14c$, $18c$ and a bottom edge $14d$, $18d$, respectively. The top and bottom edges $14c$, $18c$, $14d$, $18d$ of the first and second corrugated sheets $14$, $18$ are defined by the manner in which the first and second corrugated sheets $14$, $18$ are oriented in the biological treatment system $12$, as will be described in greater detail below. The top and bottom edges $14c$, $18c$, $14d$, $18d$ are generally oriented perpendicular relative to the first and second longitudinal axes $22$, $24$, but are not so limited. For example, the top and bottom edges $14c$, $18c$, $14d$, $18d$ may be angled relative to the first and second longitudinal axes $22$, $24$ or may include a predetermined wave pattern. However, it is preferred that the top and bottom edges $14c$, $18c$, $14d$, $18d$ are generally perpendicular relative to the first and second longitudinal axes $22$, $24$, for reasons that will become apparent to one having ordinary skill in the art upon reviewing the present disclosure.

Referring to FIGS. 1-2A, in the preferred embodiment, the corrugations of the first and second corrugated sheets $14$, $18$ include longitudinal corrugations $14L_C$, $18L_C$, $14L_E$, $18L_E$ and the angled corrugations $14A_R$, $14A_L$, $18A_R$, $18A_L$. The longitudinal corrugations $14L_E$, $18L_E$ are preferably positioned at least at the top edge $14c$, $18c$ and the bottom edge $14d$, $18d$ of the first and second corrugated sheets $14$, $18$. The longitudinal corrugations $14L_C$, $18L_C$, $14L_E$, $18L_E$ are preferably, generally oriented parallel to the first and second longitudinal axes $22$, $24$ or form first and second corrugation angles $\Delta$, $\Theta$ of approximately zero degrees (0°). The longitudinal corrugations $14L_C$, $18L_C$, $14L_E$, $18L_E$ provide stiffness and strength in the direction of the first and second longitudinal axis $22$, $24$ to the first and second corrugated sheets $14$, $18$.

In the preferred embodiment, the longitudinal corrugations $14L_C$, $18L_C$, $14L_E$, $18L_E$ include end longitudinal corrugations $14L_E$, $18L_E$ located proximate the top and bottom edges $14c$, $18c$, $14d$, $18d$ and central longitudinal corrugations $14L_C$, $18L_C$ located proximate a middle portion of the first and second corrugated sheets $14$, $18$ between the top and bottom edges $14c$, $18c$, $14d$, $18d$. The first and second corrugated sheets $14$, $18$ are not limited to inclusion of the end and central longitudinal corrugations $14L_E$, $18L_E$, $14L_C$, $18L_C$, and may not include any longitudinal corrugations or may include exclusively longitudinal corrugations that extend from the top edge $14c$, $18c$ to the bottom edge $14d$, $18d$. The longitudinal corrugations $14L_E$, $18L_E$, $14L_C$, $18L_C$ provide stiffness and strength to the first and second corrugated sheets $14$, $18$ in a direction of the longitudinal axes $22$, $24$ and less stiffness and strength in a direction of first and second transverse axes $26$, $28$ of the first and second corrugated sheets $14$, $18$, respectively.

The angled corrugations $14A_R$, $14A_L$, $18A_R$, $18A_L$ of the first and second corrugated sheets $14$, $18$ also provide stiffness and strength in the direction of the longitudinal axes $22$, $24$, but further provide stiffness and strength in a direction generally perpendicular to the longitudinal axes $22$, $24$ or along first and second transverse axis $26$, $28$, in particular, when the first and second corrugated sheets $14$, $18$ are laminated or otherwise fastened together. The positioning of the longitudinal corrugations $14L_C$, $18L_C$, $14L_E$, $18L_E$ at the top and bottom edges $14c$, $18c$, $14d$, $18d$, respectively, generally inhibit crushing, deformation or other significant damage to the top and bottom edges $14c$, $18c$, $14d$, $18d$ and also provide stiffness and strength to the corrugated sheets $14$, $18$ in the direction of the longitudinal axes $22$, $24$. However, the first and second corrugated sheets $14$, $18$ are not limited to inclusion of both longitudinal and angled corrugations $14L_C$, $18L_C$, $14L_E$, $18L_E$, $14A_R$, $18A_L$, $14A_R$, $18A_L$, to positioning of the end longitudinal corrugations $14L_E$, $18L_E$ at the top and bottom edges $14c$, $18c$, $14d$, $18d$ or to positioning of the central longitudinal corrugations $14L_C$, $18L_C$ generally at a central location between the top and bottom edges $14c$, $18c$, $14d$, $18d$. For example, the first and second corrugated sheets $14$, $18$ may exclusively include longitudinal corrugations that extend from the top edge $14c$, $18c$ to the bottom edge $14d$, $18d$ or may include exclusively angled corrugations. However, it is preferred that the first and second corrugated sheets 14, 18 include both the longitudinal and angled corrugations $14L_C$, $18L_C$, $14L_E$, $18L_E$, $14A_R$, $14A_L$, $18A_R$, $18A_L$ to provide desired properties for the first and second corrugated sheets 14, 18 for typical environments and applications encountered by the first and second corrugated sheets 14, 18 during use.

Referring to FIGS. 1A and 2A, in the preferred embodiment, the right-hand corrugations $14A_R$, $18A_R$ are preferably separated from the left-hand corrugations $14A_L$, $18A_L$ by the central longitudinal corrugations $14L_C$, $18L_C$ of the first and second corrugated sheets 14, 18. For example, in the preferred embodiment, the first corrugated sheet 14 includes the first right-hand angled corrugations $14A_R$ proximate the top edge 14c or corrugations that extend at the first right-hand corrugation angle $\Delta_R$ toward the top edge 14c and toward the right of the first longitudinal axis 22 and first left-hand angled corrugations $14A_L$ proximate the bottom edge 14d or corrugations that extend toward the top edge 14c and toward the left of the first longitudinal axis 22 at the first left-hand corrugation angle $\Delta_L$. In addition, for example, the second corrugated sheet 18 includes the second left-hand angled corrugations $18A_L$ proximate the top edge 18c or angled corrugations that extend to the left and toward the top edge 18c at the second left-hand corrugations angle $\Theta_L$ and the second right-hand angled corrugations $18A_R$ proximate the bottom edge 18d or angled corrugations that extend toward the top edge 18c and toward the right relative to the second longitudinal axis 24 at the second right-hand corrugation angle $\Theta_R$. The preferred right-hand and left-hand angled corrugations $14A_R$, $14A_L$, $14A_R$, $18A_L$ of the first and second corrugated sheets 14, 18 are preferably separated by a row of central longitudinal corrugations $14L_C$, $18L_C$. The central longitudinal corrugations $14L_C$, $18L_C$ provide a row of longitudinal corrugations $14L_C$, $18L_C$ along which the first and/or second corrugated sheets 14, 18 may be cut to form additional first and second corrugated sheets, as will be described in greater detail below.

Figure 3:
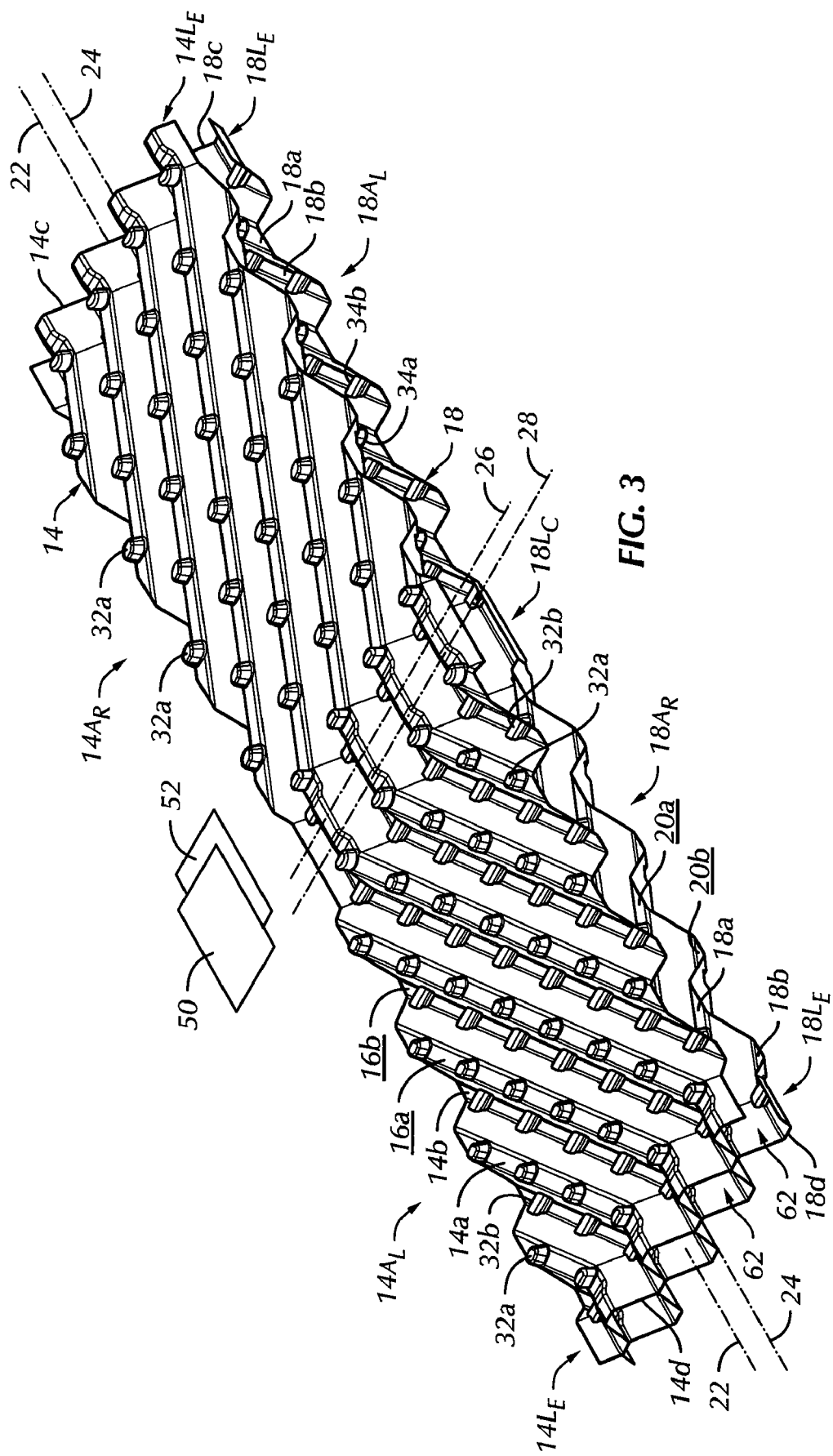
FIG. 3 is a top isometric view of the portion of the first corrugated sheet shown in FIG. 1 mounted to the portion of the second corrugated sheet shown in FIG. 2, in accordance with the preferred embodiment of the present application.
Figure 6:
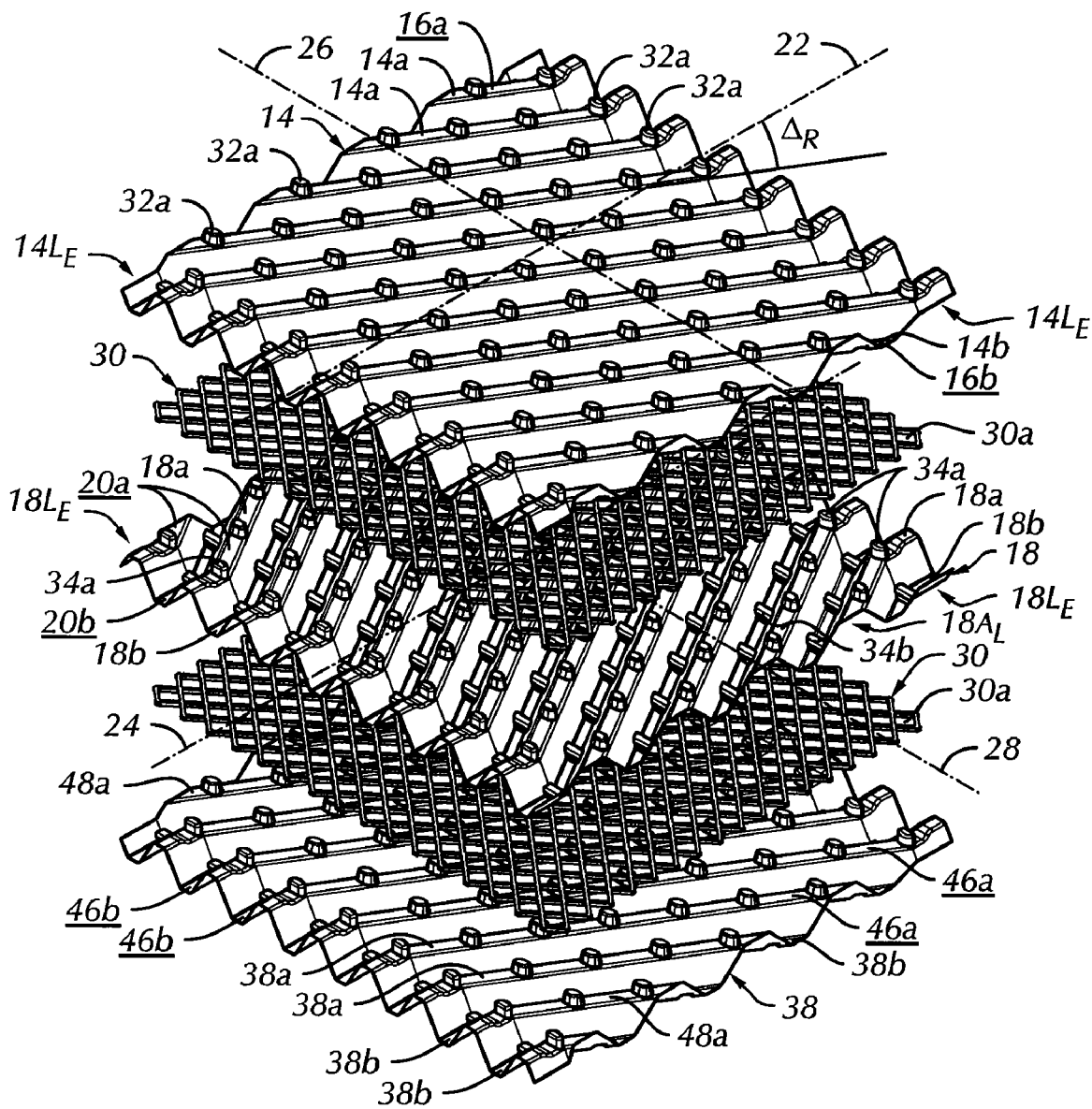
FIG. 6 is an exploded, top isometric view of a portion of the first corrugated sheet shown in FIG. 1A, a portion of the second corrugated sheet shown in FIG. 2A, a portion of the additional corrugated sheet shown in FIG. 4 and a pair of intermediate members aligned with each other for assembly in accordance with the preferred embodiment of the present application.
Figure 7:
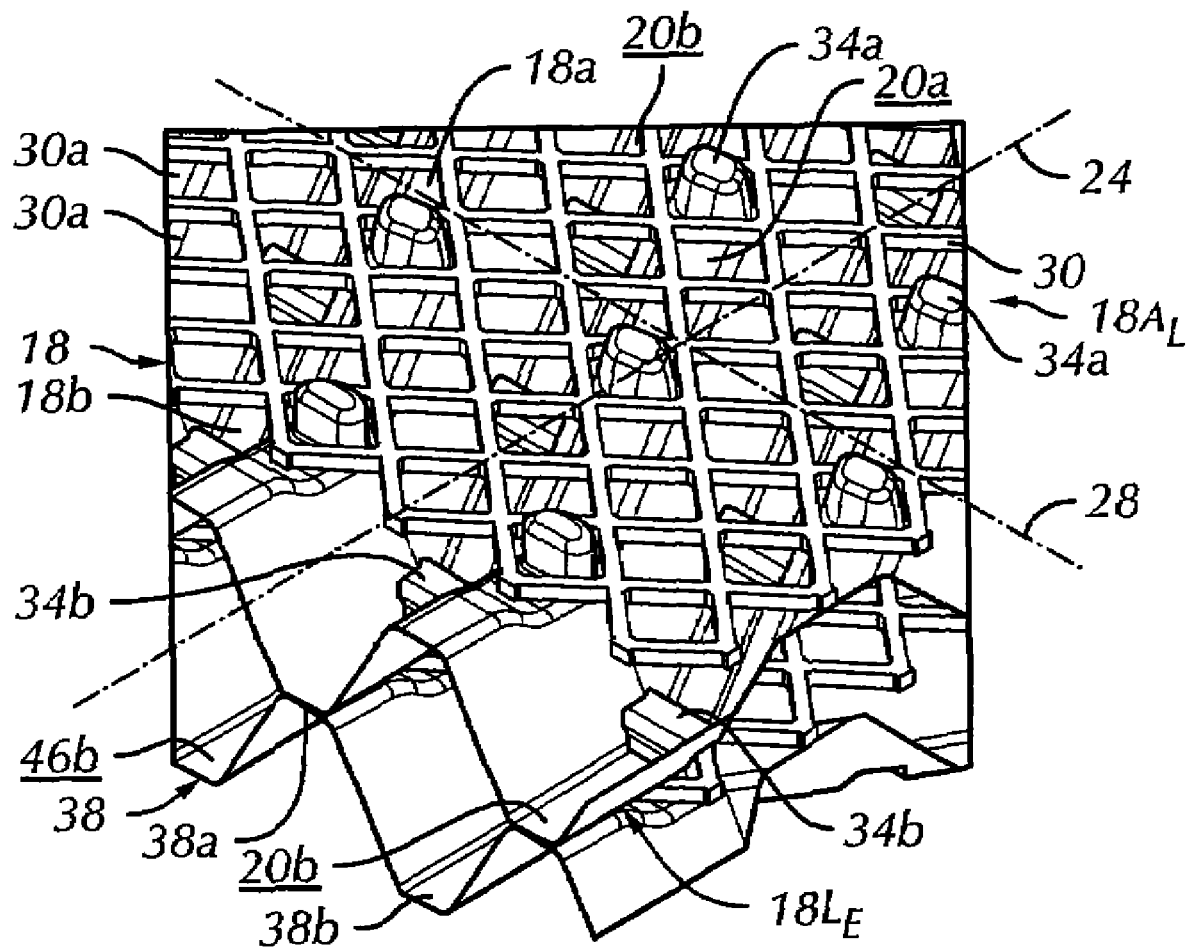
FIG. 7 is a top isometric view of an intermediate member mounted on the second corrugated sheet shown in FIG. 2A and an additional corrugated sheet shown in FIG. 4 assembled to the second corrugated sheet in accordance with the preferred embodiment of the present application.

Referring to FIGS. 3, 6 and 7, in the preferred embodiment, the first and second corrugated sheets 14, 18 are stacked or assembled relative to each other by positioning the longitudinal corrugations $14L_C$, $18L_C$, $14L_E$, $18L_E$ proximate to each other, the right-hand corrugations $14A_R$ of the first corrugated sheet 14 proximate the left-hand corrugations $18A_L$ of the second corrugated sheet 18 and the left-hand corrugations $14A_L$ of the first corrugated sheet 14 proximate the right-hand corrugations $18A_L$ of the second corrugated sheet 18 with the first corrugated sheet 14 being positioned above the second corrugated sheet 18. Accordingly, in the assembled or mounted position of the first and second corrugated sheets 14, 18, a cross-corrugation effect is created between the first and second corrugated sheets 14, 18 in the area of the angled corrugations $14A_R$, $14A_L$, $18A_R$, $18A_L$. That is, proximate the top edges 14c, 18c the first corrugated sheet 14 includes first right-hand angled corrugations $14A_R$ positioned over second left-hand angled corrugations $18A_L$ of the second corrugated sheet 18 and proximate the lower edge 14d, 18d, the first corrugated sheet 14 includes first left-hand angled corrugations $14A_L$ positioned over second right-hand corrugations $18A_R$ of the second corrugated sheet 18. In addition, in this assembled or mounted configuration, the longitudinal corrugations $14L_E$, $18L_E$, $14L_C$, $18L_C$ of the first and second corrugated sheets 14, 18 are aligned with each other proximate the top edge 14c, 18c, the bottom edge 14d, 18d and proximate the middle of the first and second corrugated sheets 14, 18. In addition, if the first and second corrugated sheets 14, 18 are cut in half at the central longitudinal corrugations $14L_C$, $18L_C$, the central longitudinal corrugations $14L_C$, $18L_C$ are eliminated, however, the first and second corrugated sheets 14, 18 preferably continue to have cross-corrugations in the areas where the angled corrugations $14A_R$, $14A_L$, $18A_R$, $18A_L$ are positioned proximate to each other (FIG. 6).

Referring to FIGS. 6 and 7, an intermediate member 30 is mounted between the first and second corrugated sheets 14, 18 and has openings 30a therein. In the preferred embodiment, the intermediate member 30 is comprised of a sheet of synthetic, polymeric material. The synthetic polymeric material may be comprised of a polyester material, PVC or other like material that provides a large surface area for growth of the biomass material thereon for treatment of the sludge and wastewater 10. The intermediate member 30 is not limited to having the openings 30a therein or to constructions comprised of polyester or PVC material. For example, the intermediate member 30 may be constructed of a generally planar sheet with no openings therein that is constructed of a fabric or textile material or other material that permits growth of the biomass thereon for treatment of the sludge and/or wastewater 10. Preferably, the fabric or textile material has an open, knitted structure with increased surface area such as, without limitation, the previously mentioned U.S. Pat. No. 5,771,716. The preferred materials of the intermediate member 30 are generally considered non-structural materials in the context of the present application in that the open, knitted fabric or textile material is generally unable to retain a preferred expanded or stretched shape within the biological treatment system 12 of the present invention while supporting the weight of a biomass growing thereon, as will be understood by one having ordinary skill in the art. Accordingly, the non-structural intermediate member 30 generally needs a support structure to maintain its preferred expanded or stretched shape in the biological treatment system 12, as will be described in greater detail below.

In the preferred embodiment, the first corrugated sheet 14 includes a plurality of projections 32a extending outwardly from the peak surfaces 16a of the crests 14a and a plurality of depressions 32b formed in the trough surfaces 16b of the valleys 14b. In addition, the second corrugated sheet 18 includes a plurality of projections 34a extending outwardly from the peak surfaces 20a of the crests 18a and a plurality of depressions 34 formed in the trough surfaces 20b of the valleys 18b. The projections 34a of the second corrugated sheet 18 are preferably positioned in mating depressions 32b of the first corrugated sheet 14 to mount and align the first corrugated sheet 14 to the second corrugated sheet 18 and to mount the intermediate member 30 between the first and second corrugated sheets 14, 18. Specifically, in the preferred embodiment, the projections 34a of the second corrugated sheet 18 extend through the openings 30a in the intermediate sheet 30 to anchor the intermediate sheet 30 in a predetermined position between the first and second corrugated sheets 14, 18 in the assembled configuration.

Figure 4:
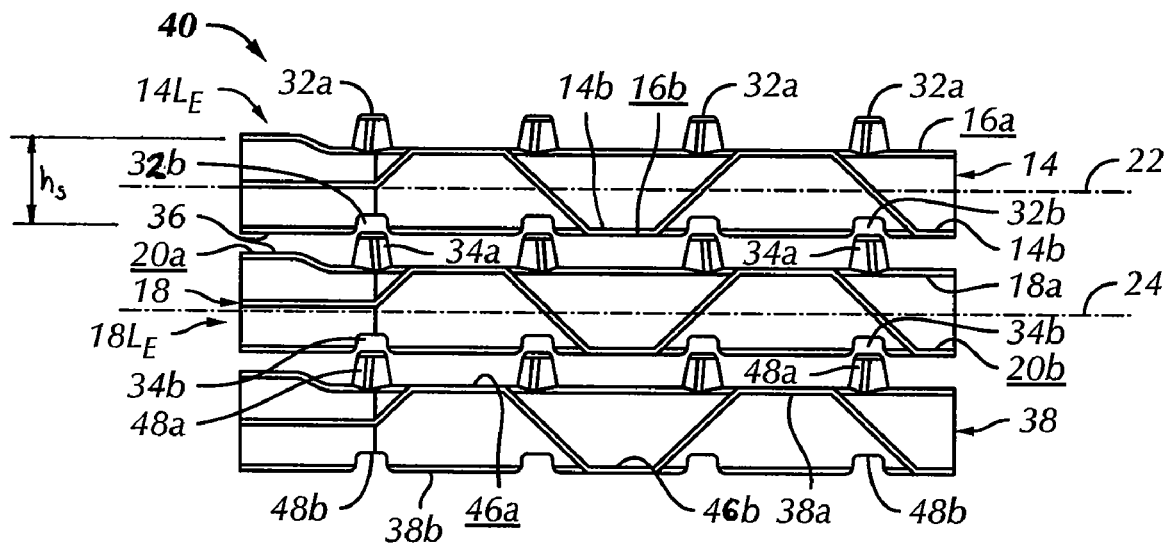
FIG. 4 is a partially exploded side elevational view of a portion of the first corrugated sheet shown in FIG. 1, the second corrugated sheet shown in FIG. 2 and an additional corrugated sheet aligned with each other for assembly to form a sheet block, wherein an intermediate member is not shown for clarity.
Figure 5:
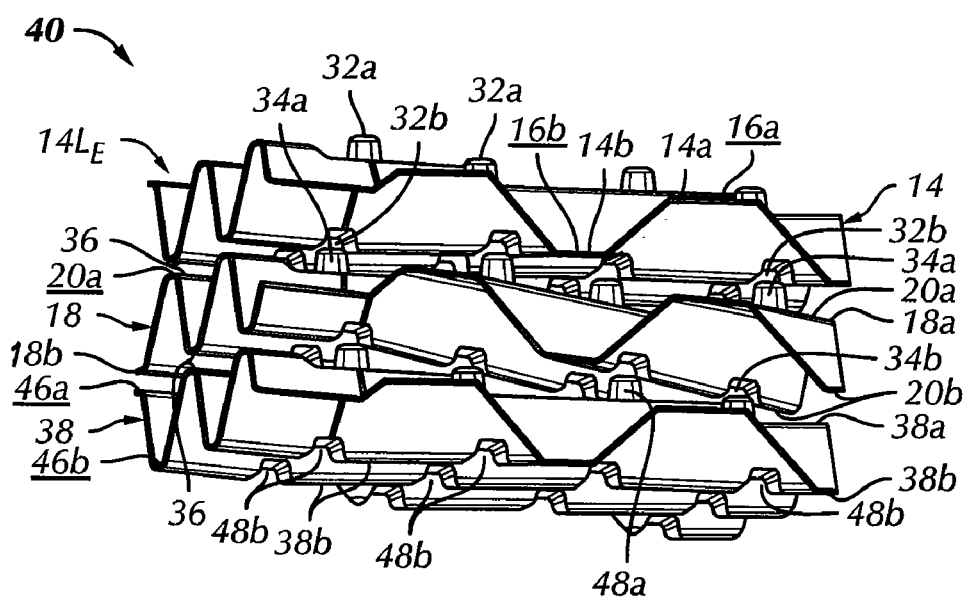
FIG. 5 is a side isometric view of the first corrugated sheet, the second corrugated sheet and the additional corrugated sheet shown in FIG. 4 aligned with each other for assembly into the sheet block having a cross-corrugation pattern, wherein the intermediate member is not shown for clarity.

Referring to FIGS. 4 and 5, in the preferred embodiment, an adhesive, solvent glue or mechanical assembly boss (not shown) is located at mating surfaces between the projections 34a of the second corrugated sheet 18 and the mating depressions 32b of the first corrugated sheet 14 to secure the first corrugated sheet 14 to the second corrugated sheet 18 and the intermediate member 30 between the first and second corrugated sheets 14, 18. The first and second corrugated sheets 14, 18 are not limited to being secured to each other by positioning the projections 34a of the second corrugated sheet 18 in the mating depressions 32b of the first corrugated sheet and adhesively bonding, solvent bonding or mechanically fastening the projections 34a in the mating depressions 32b. For example, the first and second corrugated sheets 14, 18 may be constructed without any projections or depressions and may have relatively planar peak surfaces 16a, 20a and trough surfaces 16b, 20b that come into facing engagement where the angled corrugations $14A_R$, $14A_L$, $18A_R$, $18A_L$ cross each other in the cross-corrugation sections of the assembly. These mating surfaces may be solvent or adhesively bonded, fusion bonded, mechanically deformed, clamped, mechanically retained or otherwise the first and second corrugated sheets 14, 18 may be secured to each other with the intermediate member 30 therebetween. For example, the first and second corrugated sheets 14, 18 may be mounted to each other by adhesively bonding edge mating surfaces 36 of the first and second corrugated sheets 14, 18 at the first and second longitudinal edge corrugations $14L_E$, $18L_E$ with the intermediate member 30 sandwiched therebetween. In addition, if the corrugated sheets 14, 18 are constructed with the projections 32a, 34a and depressions 32b, 34b, when the projections 34a of the second corrugated sheet 18 are positioned in the depressions 32b of the first corrugated sheet 14, the projections 34a may be deformed in the depressions 32b to form projection-depression couplings (not shown). The general concept of mechanically forming projection-depression couplings is described in detail in U.S. Pat. No. 6,544,628 B1, which is incorporated herein by reference. Further, the first and second corrugated sheets 14, 18 may be constructed with projections 32a, 34a but no depressions 32b, 34b and the projections 32a, 32b may be adhesively bonded, solvent glued or mechanically fastened to the valleys 14b, 18b of an adjacent corrugated sheet 14, 18, as will be apparent to one having ordinary skill in the art.

Referring to FIGS. 4-9, in the preferred embodiment, the assembly includes a plurality of additional corrugated sheets 38 and a plurality of additional intermediate members 30 (one additional intermediate member 30 shown in FIG. 6). The plurality of additional corrugated sheets 30 are mounted to at least one of the first corrugated sheet 14 or the second corrugated sheet 18 with one of the plurality of additional intermediate members 30 mounted therebetween to form a sheet block 40. The plurality of additional corrugated sheets 38 has a similar or nearly identical construction and configuration to the first or second corrugated sheets 14, 18. However, the plurality of additional corrugated sheets 38 are not limited to being identically or nearly identically constructed when compared to the first and second corrugated sheets 14, 18 and may have nearly any construction and or configuration that permits mounting of the additional corrugated sheet or sheets 38 to the first or second corrugated sheets 14, 18 with one of the intermediate members 30 mounted therebetween or mounting the additional corrugated sheets 38 to each other with the intermediate sheets 30 therebetween. In addition, the sheet block 40 may be constructed with two (2) or more intermediate sheets 30 mounted between one or more pairs of the first and second or additional corrugated sheets 38 to provide additional surface area for the biomass.

Figure 8:
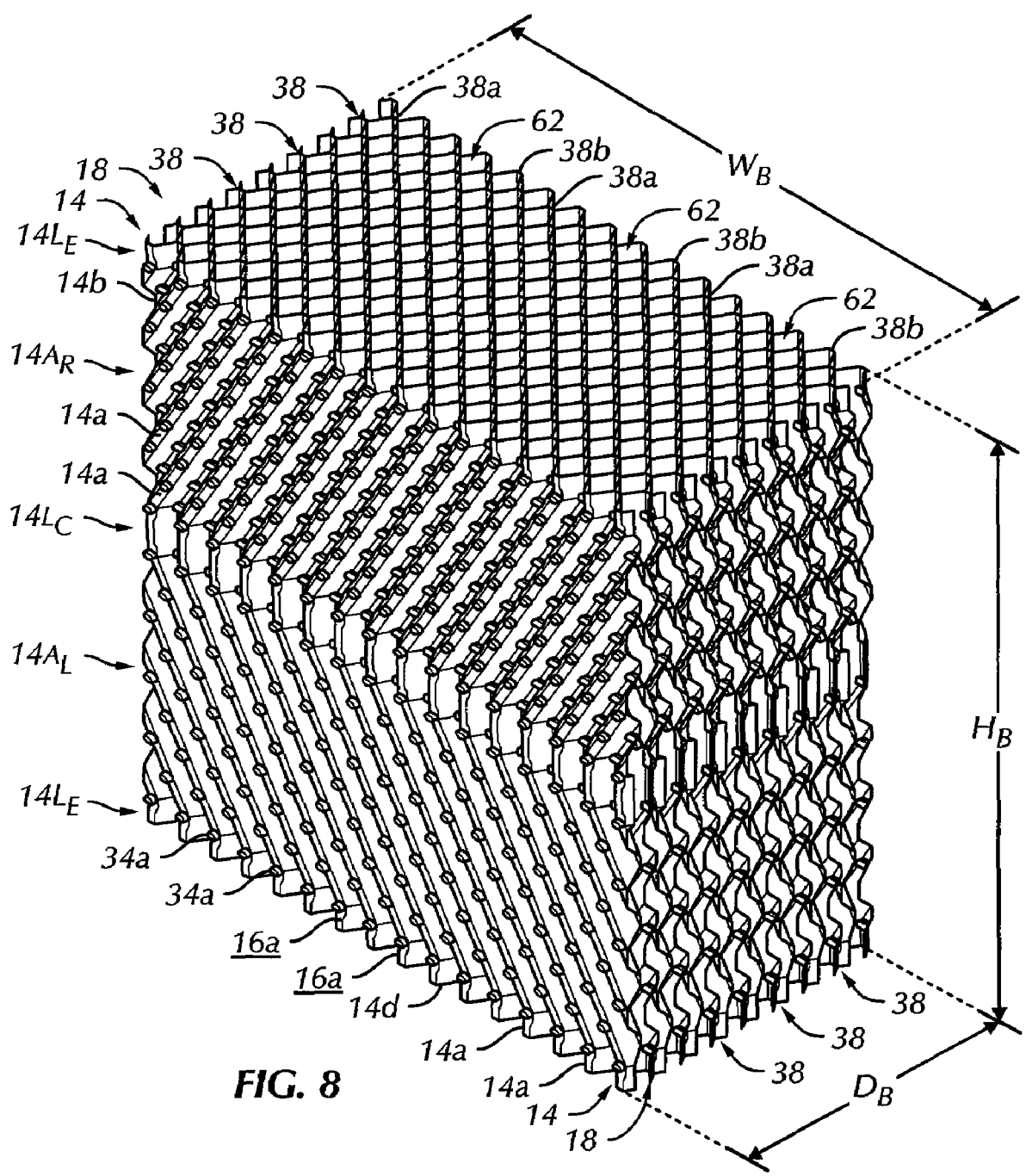
FIG. 8 is a top isometric view of a media block of the biological treatment assembly of the preferred embodiment of the present application

Referring to FIG. 8, in the preferred embodiment, the sheet block 40 is constructed of at least the first corrugated sheet 14, the second corrugated sheet 18, the additional corrugated sheet 38 and at least one of the intermediate members 30 mounted between a pair of the first, second and additional corrugated sheets 14, 18, 38. In the most preferred embodiment, the sheet block 40 is constructed of the first corrugated sheet 14, the second corrugated sheet 18, a non-structural intermediate member 30 mounted between the first and second corrugated sheets 14, 18, a plurality of additional corrugated sheets 38 mounted to the first and/or second corrugated sheets 14, 18 and a plurality of additional intermediate members 30 mounted between each of the pairs of additional intermediate members 30 and between the additional corrugated sheets 38 and/or the first and second corrugated sheets 14, 18. The preferred sheet block 40 has a block width $W_B$, a block height $H_B$ and a block depth $D_B$. The block width $W_B$ is about four feet (4') to about eight feet (8'), the block height $H_B$ is about two feet (2') to about four feet (4') and the block depth $D_B$ is about one foot (1') to about four feet (4') in the preferred embodiment. In the most preferred embodiment, the block depth $D_B$ is about two feet (2'). The block width $W_B$, the block height $H_B$ and the block depth $D_B$ are not limited to the above-described dimensions and may have nearly any dimension that is desired by a user. However, the above-described dimensions of the assembly of the sheet block are preferred for manufacturability and the ability of an operator to assemble the sheet blocks 40 in a reasonable manner. That is, the operator is generally able to reasonably manipulate and otherwise move the above-described sheet block 40 without significant mechanical assistance.

Figure 9:
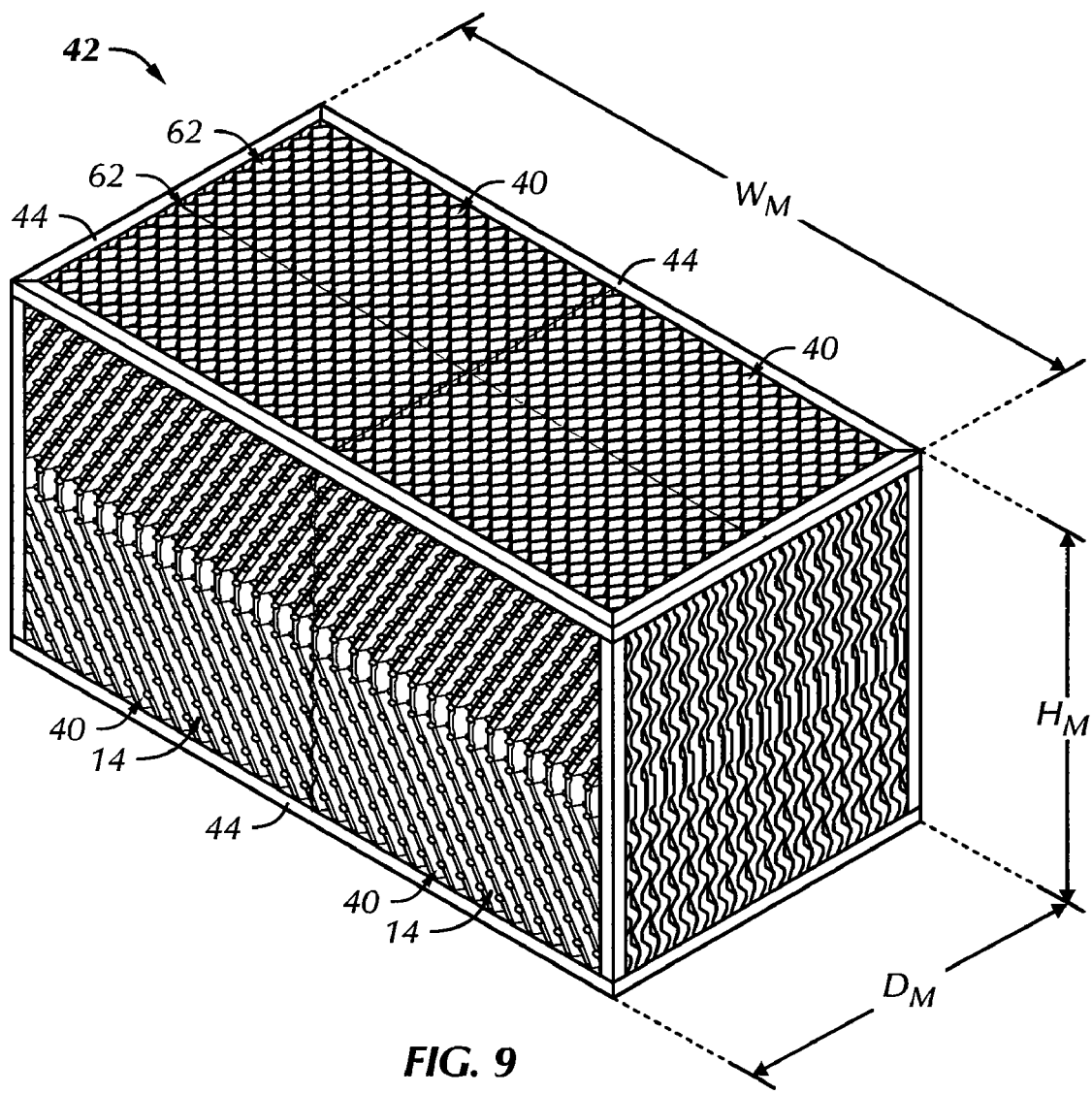
FIG. 9 is a top isometric view of a treatment module of the biological treatment assembly of the preferred embodiment of the present application.

Referring to FIG. 9, in the preferred embodiment, a treatment module 42 is constructed of an assembly of sheet blocks 40 stacked relative to each other. The preferred treatment module 42 has a module width $W_M$, a module height $H_M$ and a module depth $D_M$. The module width $W_M$ is preferably about four feet (4') to about eight feet (8'), the module height $H_M$ is about two feet (2') to about eight feet (8') and the module depth $D_M$ is about two feet (2') to about eight feet (8') in the preferred embodiment. The module width $W_M$, the module height $H_M$ and the module depth $D_M$ are not limited to the above-described dimensions, however, the treatment module 42 is preferably sized and shaped in this manner for ease of manufacturability and use, as will be apparent to one having ordinary skill in the art. The module width $W_M$, the module height $H_M$ and the module depth $D_M$ may have nearly any size, shape and configuration that may be constructed for adapting to use in the biological treatment system 12, as will be described in greater detail below.

The preferred treatment module 42 shown in FIG. 9 is comprised of four sheet blocks 40 having a block width $W_B$ of approximately four feet (4'), a block height $H_B$ Of approximately four feet (4') and a block depth $D_B$ of approximately two feet (2') that are stacked in the manner shown to define the treatment module 42 having a module width $W_M$ of approximately eight feet (8'), a module height $H_M$ of approximately four feet (4') and a module depth $D_M$ of approximately four feet (4'). As was described above, the sheet blocks 40 and treatment module 42 are not limited to the above-described dimensions but may be constructed to adapt to use in variously sized biological treatment systems 12, as will be described in greater detail below. In addition, the treatment module 42 is not limited to constructions including four (4) sheet blocks 40 stacked and assembled as is shown in FIG. 9 and may be constructed of a single sheet block 40 or nearly any number of sheet blocks 40 that may be assembled into the treatment module 42.

To provide additional stability for the treatment module 42 of the preferred embodiment, a module frame 44 is constructed around edges of the treatment module 42. The module frame 44 is preferably constructed of a series of L-shaped members that provide support and stabilize the first, second and additional corrugated sheets 14, 18, 38 and the intermediate members 30 of the treatment module 42, as well as the sheet blocks 40 within the preferred treatment module 42. The module frame 44 is preferably constructed of a stainless steel, aluminum, polymeric, composite or other like generally structurally rigid material that is able to provide stability to the treatment module 42 and is generally resistant to corrosion from the sludge and wastewater 10. However, the treatment module 42 is not limited to inclusion of the module frame 44 or to constructions utilizing any specific material and may be constructed of nearly any material or in any manner that is generally resistant to corrosion and is able to perform the general functions of the module frame 44 in the typical environment of the treatment module 42.

In the preferred embodiment, and as was described above, the additional corrugated sheets 38 are preferably constructed in a similar or nearly identical manner to the first and second corrugated sheets 14, 18 and include crests 38a, valleys 38b, peak surfaces 46a on the crests 38a, trough surfaces 46b on the valleys 38b, projections 48a extending from the peak surfaces 46a and depressions 46b extending from the trough surfaces 46b. In the preferred embodiment, shown in FIGS. 4 and 5, the projections 48a of one of the additional corrugated sheets 38 are positioned in mating depressions 34b of the second corrugated sheet 18 with adhesive therebetween and one of the additional intermediate members 30 is sandwiched therebetween, as would be apparent to one having ordinary skill in the art in view of the present disclosure.

Referring to FIGS. 3 and 6, in the preferred embodiment, the first and second longitudinal axes 22, 24 are generally positioned in a parallel orientation in the sheet block 40 and in the treatment module 42. Positioning of the first and second longitudinal axes 22, 24 in a generally parallel configuration aids in aligning the first corrugated sheet 14 with the second corrugated sheet 18 and aligning the projections 34a with the mating depressions 32b for mounting the first corrugated sheet 14 to the second corrugated sheet 18 with the intermediate member 30 therebetween. In addition, positioning of the first and second longitudinal axes 22, 24 generally parallel to each other results in the boxy shape of the sheet block 40 and the treatment module 42, which makes the treatment modules 42 relatively easy to transport and stack. If desired, the treatment modules 42 may be assembled at a job site using as components, the corrugated sheets 14, 18, 38, which can nest together and take up less space for shipping and storage. Specifically, the corrugated sheets 14, 18, 38 may be stacked together in a nested configuration with the corrugations 14$A_R$, 14$A_L$, 18$A_R$, 18$A_L$, 14$L_E$, 18$L_E$, 14$L_C$, 18$L_C$, the projections 32a, 34a, 48a and the depressions 32b, 34b, 48b of each sheet 14, 18, 38 nesting within each other, respectively. In the nested configuration (not shown), the corrugated sheets 14, 18, 38 take up less space for shipping and storage and may be shipped long distances economically for assembly with the intermediate members 30 at potentially remote manufacturing locations or field locations. The intermediate members 30 also typically do not take up significant space during shipping and storage and may be economically shipped long distances for assembly.

In the preferred embodiment, the first and second corrugated sheets 14, 18 are generally impervious to fluid flow in a direction generally perpendicular to a first sheet plane 50 defined by the first longitudinal axis 22 and the first transverse axis 26. In addition, the first and second corrugated sheets 14, 18, the sheet block 40 and the treatment module 42 are preferably impervious to fluid flow in a direction generally perpendicular to the first sheet plane 50 and a second sheet plane 52 defined by the second longitudinal axis 24 and the second transverse axis 28. That is, the first and second corrugated sheets 14, 18 and, preferably, the additional corrugated sheets 38 are impervious to fluid flow generally perpendicularly to the first and second sheet planes 50, 52 or the sheets 14, 18, 38 preferably do not include holes perpendicular to the sheet planes 50, 52 and are preferably not constructed of fluid porous materials. The first, second and additional corrugated sheets 14, 18, 38 are not limited to being impervious to fluid flow generally perpendicularly to the first and second sheet planes 50, 52 and may include relatively minor holes or penetrations therein that are created by mechanically securing or otherwise fastening the corrugated sheets 14, 18, 38 together or holes (not shown) punctured therein to create flow through the corrugated sheets 14, 18, 38. However, it is preferred that the corrugated sheets 14, 18, 38 are impervious to fluid flow generally perpendicular to the first and second sheet planes 50, 52 such that sludge and wastewater that flows through the treatment module 42 flows to and/or from the top and bottom edges 14c, 18c, 14d, 18d, as will be described in greater detail below.

Referring to FIGS. 1-2A, in the preferred embodiment, the first and second corrugated sheets 14, 18 have a sheet length $l_S$, a sheet width $w_S$ and a corrugation height $h_S$. In the preferred embodiment, the corrugation height $h_S$ is about one half inch (½") to about four inches (4"), probably about three-fourths of an inch (¾") to about two inches (2") and more preferably about one and one-half inches (1½"), and the sheet length $l_S$ and the sheet width $w_S$ are about two feet (2') to about four feet (4'). The additional corrugated sheets 38 are preferably sized and configured in the same manner as the first and second corrugated sheets 14, 18 for any specific sheet block 40 or treatment module 42, as will be apparent to one having ordinary skill in the art in view of the present disclosure. The first, second and additional corrugated sheets 14, 18, 38 are not limited to the above-described dimensions and may have nearly any sheet length $l_S$, sheet width $w_S$ and corrugation height $h_S$ as may be desired by a user to adapt to a specific application. The sheet length $l_S$, sheet width $w_S$ and corrugation height $h_S$ are preferably the same for a specific application for the first corrugated sheet 14, the second corrugated sheet 18 and the additional corrugated sheets 38, but the sheets 14, 18, 38 are not limited to having the same or nearly the same size and/or shape.

In the preferred embodiment, the first, second and additional corrugated sheets 14, 18, 38 include the central longitudinal corrugations 14$L_C$, 18$L_C$ approximately halfway along the sheet length $l_S$. Accordingly, a four foot by four foot (4'×4') first, second or additional corrugated sheet 14, 18, 38 may be cut into quarters to form four individual corrugated sheets 14, 18, 38 for stacking into sheet blocks 40 and/or into treatment modules 42 having a variable size, as will be understood by one having ordinary skill in the art in view of the present disclosure. Such adaptability of the corrugated sheets 14, 18, 38 is desirable for a user for assembling variably sized sheet blocks 40 and/or treatment modules 42 for various applications. However, the ability to cut the corrugated sheets 14, 18, 38 into smaller portions for assembling or constructing sheet blocks 40 and treatment modules 40 having different sizes and/or shapes is not limiting.

Figure 10:
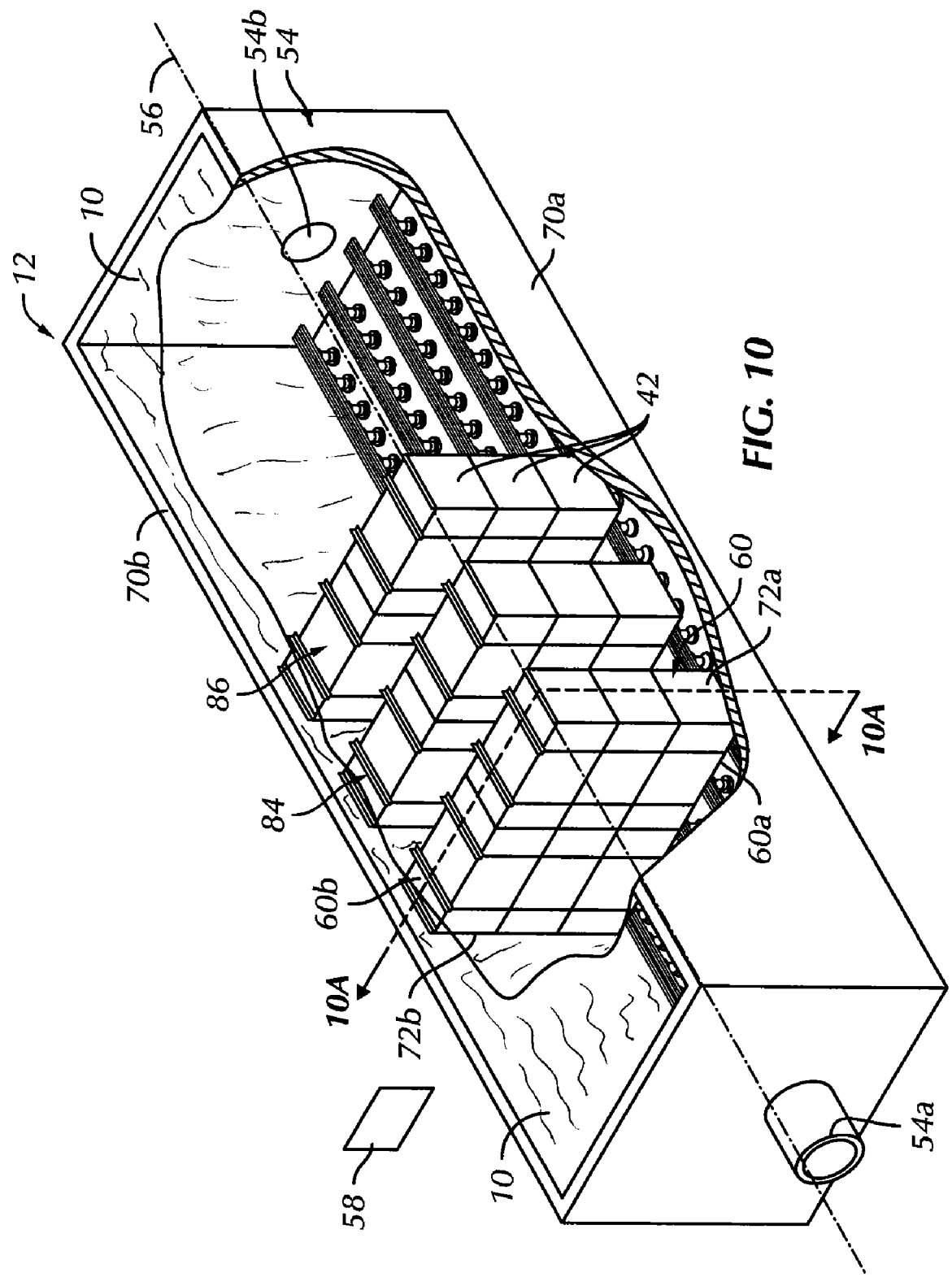
FIG. 10 is a top isometric view of a biological treatment system in accordance with the preferred embodiment of the present application.
Figure 10A:
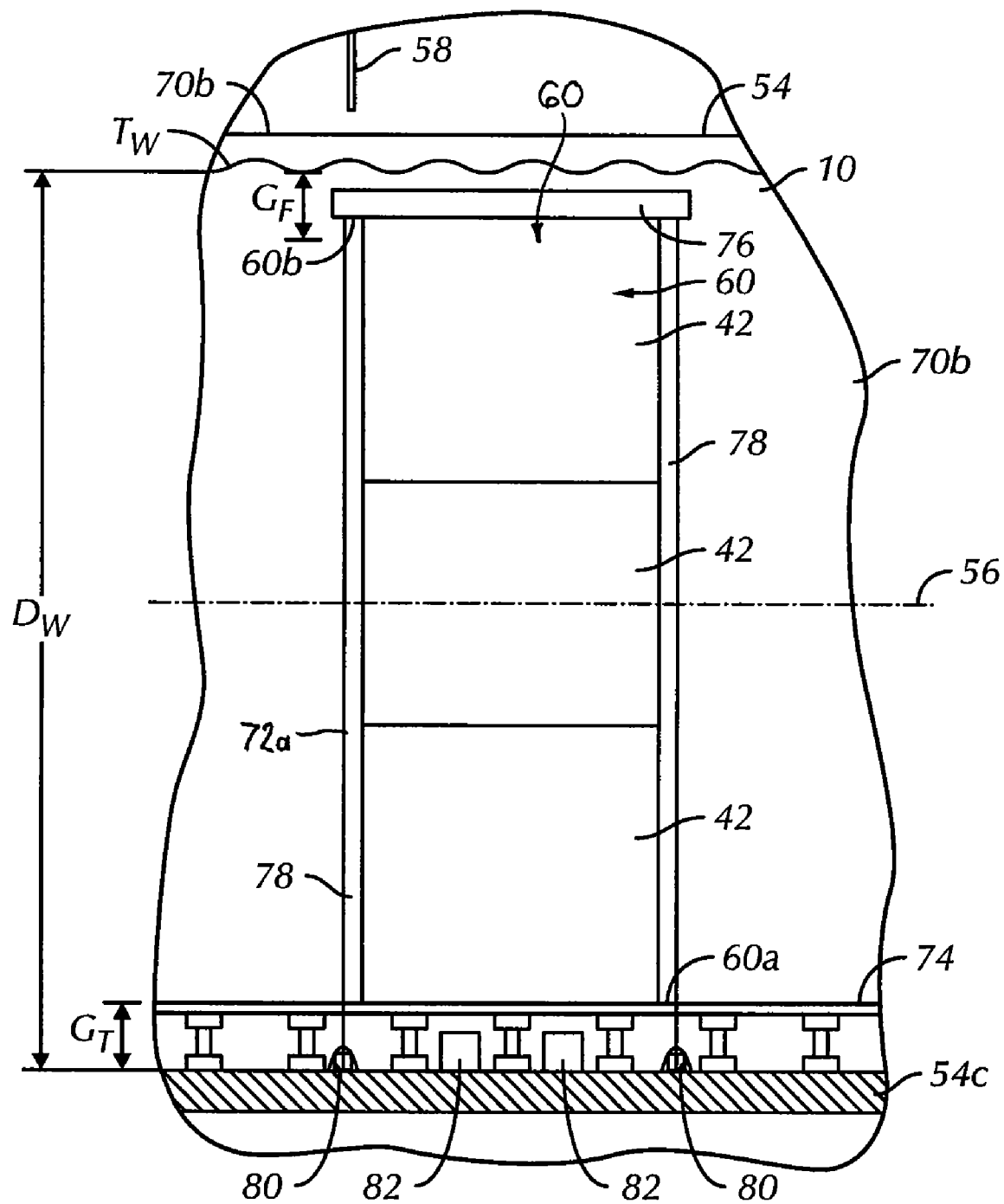
FIG. 10A is a side line of sight view of a portion of the biological treatment system of FIG. 10, taken along line 10A-10A of FIG. 10.

Referring to FIGS. 9-10A, the biological treatment system 12 of the present invention preferably utilizes the treatment modules 42, constructed in a manner as was described above, to at least one of remove ammonia nitrogen from and reduce the BOD of the sludge or wastewater 10 in a basin 54. The basin 54 includes the sludge and/or wastewater 10 therein and has an inlet 54a, an outlet 54b and a longitudinal basin axis 56. A first media tower 60 is positioned within the basin 54 and defines a tower plane 58 that is generally transverse to the basin axis 56. The first media tower 60 is generally impervious to fluid flow perpendicular to the tower plane 58. In the preferred embodiment, the first media tower 60 is constructed of a plurality of treatment modules 42 stacked on top of each other such that the longitudinal axes 22, 24 and module height $H_M$ are generally perpendicular to the basin axis and the module depths $D_M$ is generally parallel to the basin axis 56.

Accordingly, the first and second sheet planes 50, 52 are generally parallel to the tower plane 58, such that the treatment modules 42 and the first media tower 60 are generally impervious to fluid flow in a direction generally parallel to the basin axis 56. The first media tower 60 is not limited to including a plurality of stacked treatment modules 42 and may be comprised of a single treatment module 42 positioned within the basin 54 or nearly any number of treatment modules 42 stacked within the basin 54 for treating the wastewater and sludge 10, depending upon the size and shape of the basin 54 and the treatment module(s) 42.

In an alternative configuration, the first media tower 60 may be rotated about a vertical axis ninety degrees (90°) such that the tower plane 58 is oriented generally parallel to the basin axis 56 and the tower plane 58 is generally parallel to a first and second side wall 70a, 70b of the basin 56. In such an orientation, the sludge and wastewater 10 within the basin 54 may flow through the first media tower 60 generally parallel to the basin axis 56 and generally vertically. This configuration of the first media tower 60 may be particularly useful for anoxic treatment systems and will be described in greater detail below.

Referring to FIGS. 10 and 10A, in the exemplary and preferred embodiment, the first media tower 60 is constructed of six treatment modules 42 stacked three high and two wide in the basin 54. The first media tower 60 is not limited to constructions formed of six treatment modules 42 and may be constructed of nearly any number of treatment modules 42 having nearly any size and shape that is adapted for a specific basin 54.

Referring to FIGS. 7-10A, the first media tower 60 includes a plurality of intermediate members 30, with each intermediate member 30 being mounted between a pair of corrugated sheets 14, 18, 38 within the treatment modules 42. The intermediate members 30 are preferably positioned between each of the corrugated sheets 14, 18, 38 in the treatment modules 42. The first media tower 60 includes a base edge 60a and a top edge 60b. In the preferred embodiment, the base edge 60a is positioned at a bottom of the treatment modules 42 that are positioned proximate a floor 54c of the basin 54 and the top edge 60b is defined by the top of the treatment modules 42 spaced at a distance from the floor 54c of the basin 54. The top edge 60b is preferably positioned below a top surface $T_W$ of the wastewater and sludge 10.

Referring to FIGS. 3 and 8, a plurality of flow channels 62 extend through the treatment modules 42 and the first media tower 60 from the base edge 60a to the top edge 60b. The flow channels 62 are defined by spaces between the plurality of intermediate members 30 and the corrugated sheets 14, 18, 38. The flow channels 62 are preferably non-linear or are generally not comprised of a direct flow path from the base edge 60a to the top edge 60b in the first media tower 60. Specifically, the cross-corrugation effect created by positioning the complimentary angled corrugations 14A_L, 18A_L, 14A_R, 18A_R over each other result in generally non-linear or zig-zag flow channels 62 through the first media tower 60. In addition, it is preferred that the intermediate members 30 are at least partially porous, for example, by constructing the intermediate members 30 of the fabric or textile material, to permit flow of sludge and wastewater 10 through the intermediate members 30 to promote additional non-linear flow in the first media tower 60. The cross-corrugation effect, the at least partially porous intermediate members 30 sandwiched between the corrugated sheets 14, 17, 38 and the projections 32a, 34a, 48a generally each promote non-linear flow from the base edge 60a to the top edge 60b in the first media tower 60, even if the first media tower 60 is comprised of a single sheet block 40 positioned in the basin 54.

The corrugations 14A_R, 14A_L, 18A_R, 18A_L, 14L_E, 18L_E, 14L_C, 18L_C preferably provide stiffness and strength to the corrugated sheets 14, 18, 38 such that the sheet block 40 is able to support its own weight, the weight of the intermediate members 30 mounted therein and the weight of the biomass growing on the sheet block 40. The corrugations 14A_R, 14A_L, 18A_R, 18A_L, 14L_E, 18L_E, 14L_C, 18L_C also preferably provide sufficient strength and stiffness to the sheet block 40 to react the typical forces encountered by the sheet blocks 40, treatment modules 42 and the first media tower 60 in the biological treatment system 12 during normal use. Accordingly, the corrugated sheets 14, 18, 38 are typically considered structural in the present application in that they are able to support these weights in the assembled configuration. In addition, the intermediate members 30 are typically considered non-structural members in the present application in that they are typically not able to support their own weight or the weight of the biomass growing thereon while retaining their preferred shape and location within the basin 54. The intermediate members 30 do have structural properties, in that they are typically able to support at least the weight of the biomass growing thereon and any additional loads encountered during normal use such as wastewater and sludge 10 flow drag or impact loads for distribution of the loads to the corrugated sheets 14, 18, 38 without significant damage occurring to the intermediate members 30. However, the intermediate members 30 are typically considered non-structural members in the present application in that they are typically not able to support their own weight or the weight of the biomass growing thereon while retaining their preferred shape and location within the basin 54. For example, the preferred intermediate members 30 constructed of the open, knitted fabric or textile material described in U.S. Pat. No. 5,771,716 is generally unable to support its own weight or the weight of the biomass growing thereon while retaining an expanded shape within the basin 54 without the additional support of the corrugated sheets 14, 18, 38 or an alternative support structure, such as the stainless steel support structure of the prior art.

The first media tower 60 is not limited to having non-linear flow channels 62. For example, the corrugations of the corrugated sheets 14, 18, 38 may be generally parallel to the longitudinal axis 22, 24 or may be comprised of all longitudinal corrugations 14L_C, 18L_C, 14L_E, 18L_E with the intermediate members 30 mounted therebetween, resulting in generally linear flow channels 62 from the base edge 60a to the top edge 60b of the first media tower 60. However, the generally non-linear or circuitous flow channels 62 are preferred to create additional contact between the sludge and wastewater 10 flowing through the flow channels 62 with the biomass growing on the surfaces of the corrugated sheets 14, 18, 38 and the intermediate members 30. The wastewater and sludge 10 that moves or flows along each of the flow channels 62 of the first media tower 60 is exposed to at least portions of the biomass on the surfaces of the corrugated sheets 14, 18, 38 or the intermediate members 30. Exposure of the sludge and wastewater 10 to the bacteria forming the biomass on the surfaces of the corrugated sheets 14, 18, 38 and the intermediate members 30 aides in removal of ammonia nitrogen and other related components from and allows for reduction of the BOD of the sludge and wastewater 10.

Referring to FIGS. 10 and 10A, in the preferred embodiment, the basin 54 includes a first side wall 70a and a second side wall 70b. In addition, the first media tower 60 preferably includes a first side edge 72a and a second side edge 72b. The first side edge 72a is preferably in facing engagement with the first side wall 70a and the second side edge 72b is preferably in facing engagement with the second side wall 70b when the first media tower 60 is mounted within the basin 54. Accordingly, flow of the sludge and wastewater 10 through a significant transverse cross-section of the basin 54 is largely impeded by the first media tower 60 in a direction parallel to the basin axis 56 or generally perpendicular to the sheet plane 58 and sludge and wastewater 10 typically does not flow out of the first or second side edges 72a, 72b. Therefore, the sludge and wastewater 10 are forced over the top edge 60b or below the bottom edge 60a of the first media tower 60 as the incoming sludge and wastewater 10 flows parallel to the basin axis 56. By injecting air via an air diffuser 82 below the first media tower 60, the sludge and wastewater 10 is urged upwardly through the flow channels 62 of the treatment modules 42 in the first media tower 60 by an air lift pumping effect, thus treating sludge and wastewater 10 by interaction with the biomass growing on the corrugated sheets 14, 18, 38 and intermediate members 30. Further, the corrugations $14L_C$, $18L_C$, $14L_E$, $18L_E$, $14A_L$, $18A_L$, $14A_R$, $18A_R$ of the corrugated sheets 14, 18, 38 are able to support their own weight, the weight of the intermediate members 30, the weight of the biomass growing thereon and the typical forces encountered by the first media tower 60 in the sludge and wastewater 10 during normal operation. Sludge and wastewater 10 flowing from the top edge 60b of the first media tower 60 preferably flows horizontally along the axis 56 of the basin 54 toward the inlet and/or outlet 54a, 54b, down along the front or rear faces of the first media tower 60 and beneath the base edge 60a.

The first and second side edges 72a, 72b of the first media tower 60 are not limited to being in facing engagement with the first and second side walls 70a, 70b and may be spaced at either side edge 72a, 72b from the side walls 70a, 70b, one of the side edges 72a, 72b may be in facing engagement with one of the side walls 70a, 70b or neither of the side edges 72a, 72b may be in engagement with the side walls 70a, 70b. For example, a space may be left between one or both of the first and second side edges 72a, 72b of the first media tower 60 and the first or second side walls 70a, 70b or a block of material or shim (not shown) may be positioned between the first and/or second side edges 72a, 72b and the first and/or second side walls 70a, 70b to prevent flow around the side edges 72a, 72b of the first media tower 60. In addition, the block of material or shim may also be positioned between certain of the treatment modules 42 in the stack of treatment modules 42 that comprise the first media tower 60 between the first and second side edges 72a, 72b to generally block flow of the sludge and wastewater 10 parallel to the basin axis 56 through the first media tower 60.

The sludge and wastewater 10 within the basin 54 defines a sludge depth $D_W$ and the top surface $T_W$. The first media tower 60 is immersed in the sludge and wastewater 10 beneath the top surface $T_W$ such that each of the treatment modules 42 of the first media tower 60 are immersed in the sludge and wastewater 10 to define a tower gap $G_F$, which allows the wastewater and sludge 10 to flow freely away from the top edge 60b of the first media tower 60. Accordingly, the sludge and wastewater 10 is exposed to the biomass on potentially all of the surfaces of the first media tower 60 and the sludge and wastewater 10 is able to flow or move through the flow channels 62 and over and around the base and top edges 60a, 60b of the first media tower 60. Flow through the flow channels 62 is preferred to directly expose the sludge and wastewater 10 to a significant amount of the biomass on the surface of the first media tower 60 for treating the sludge and wastewater 10. Specifically, flow of the sludge and wastewater 10 through the flow channels 62 typically provides exposure to the surfaces of the intermediate members 30, which are particularly efficient in treating the sludge and wastewater 10.

The basin 54 includes the base wall or floor 54c and the first media tower 60 is mounted in the basin 54 such that a base gap $G_T$ is defined between the base edge 60a of the first media tower 60 and the floor 54c of the basin 54. The base gap $G_T$ permits flow of the sludge and wastewater 10 generally parallel to the basin axis 56 beneath the base edge 60a and permits flow of the sludge and wastewater 10 into and/or out of the flow channels 62 proximate the base edge 60a. The base gap $G_T$ is preferably formed by a base support structure 74 that spaces the base edge 60a of the first media tower 60 from the floor 54c. The first media tower 60 may be spaced from the floor 54c by nearly any base support structure 74; however, the first tower 60 is preferably supported and spaced from the floor 54c by an AccuPier® support system, which is a commercially available from Brentwood Industries, Inc. The AccuPier® support system supports the first media tower 60, permits flow into and out of the flow channels 62 proximate the base edge 60a through the base gap $G_T$ and may provide an anchor for fixing or supporting the first media tower 60 in the basin 54.

In the preferred embodiment, the first media tower 60 is fixed or secured in the basin 54 on the base support structure 74 through a tower mounting mechanism including top beams 76 and support cables 78 that are secured to the floor 54c by anchors 80. The first media tower 60 is preferably fixed or secured in the basin 54 to prevent shifting or movement of the treatment modules 42 in the wastewater and sludge 10 within the basin 54. The top beams 76, support cables 78 and anchors 80 are preferably resistant to corrosion due to being immersed in the sludge and wastewater 10 and have a strength and configuration that is able to secure the first media tower 60 in the basin 54 on the base support 74. The first media tower 60 is not limited to being secured to the basin 54 through the base support 74, top beams 76, support cables 78 and anchors 80, as shown and described herein, and may be secured within the basin 54 in nearly any manner, as would be apparent to one having ordinary skill in the art in view of the present disclosure in order to limit or prevent movement of the first media tower 60 relative to the basin 54 during typical use.

Referring to FIG. 10A, the air diffuser 82 is preferably mounted in the basin 54 at least partially within the base gap $G_T$ to introduce air into the sludge or wastewater 10 in the base gap $G_T$, thereby promoting flow of the sludge and wastewater 10 into the flow channels 62 toward the top edge 60b of the first media tower 60. The air diffuser 82 preferably introduces air bubbles into the sludge and wastewater 10 in the base gap $G_T$ beneath the base edge 60a. The air bubbles are lighter than the sludge and wastewater 10 and flow into and through the flow channels 62 to the top edge 60b, thereby creating an upward flow of the sludge and wastewater 10 from the base gap $G_T$ into the flow channels 62, which direct, guide and channel the upward flow from the base edge 60a to the top edge 60b. Introduction of air to promote flow through the flow channels 62 accelerates the exposure of the sludge and wastewater 10 to the biomass on the surfaces of the corrugated sheets 14, 18, 38 and the intermediate members 30 to promote treatment of the sludge and wastewater 10 through the biomass on the corrugated sheets 14, 18, 38 and the intermediate members 30. The air diffusers 82 also limit clogging of the flow channels 62 within the first media tower 60 by creating a relatively constant flow through the flow channels 62. The biological treatment system 12 is not limited to the inclusion of the air diffusers 82 and may alternatively create flow through the flow channels 62 by pumping or other mechanisms that would be apparent to one having ordinary skill in the art in view of the present disclosure. However, the air diffusers 82 are preferred to promote of flow through the flow channels 62 and also provide aeration of the sludge and wastewater 10 in the basin 54.

Referring to FIGS. 10 and 10A, the sludge and wastewater 10 within the basin 54 preferably flows from the base gap $G_T$ into the flow channels 62, out of the flow channels 62 proximate the top edge 60b, generally horizontally or parallel to the basin axis 56 in the tower gap $G_F$, past one of a front surface and a rear surface of the first media tower 60 and back into the base gap $G_T$. Accordingly, the air diffusers 82 tend to create a circular flow pattern in the first media tower 60 to continuously expose the sludge and wastewater 10 to the surfaces of the treatment modules 42 contained therein and the biomass located thereon for treating sludge and wastewater 10.

The flow pattern of the sludge and wastewater 10 through the first media tower 60 is not limited to that described above and may flow in nearly any manner relative to the first media tower 60 that exposes the sludge and wastewater 10 to at least portions of the surfaces of the treatment modules 42. For example, the air diffusers 82 may be positioned proximate front and rear surfaces of the first media tower 60 outside of the base gap $G_T$ to urge the sludge and wastewater 10 upwardly proximate the front and rear surfaces of the first media tower 60, over the top edge 60b beneath the top surface $T_W$ into the tower gap $G_F$, down through the flow channels 62 and into the base gap $G_T$. The sludge and wastewater 10 may recirculate in this flow pattern several times while flowing through the basin 54 to the outlet 54b.

Referring to FIGS. 1, 2, 3 and 8-10A, the first media tower 60 may alternatively be comprised of a single treatment module 42 or a plurality of treatment modules 42 stacked in the basin 54 such that the first and second transverse axes 26, 28 extend generally parallel relative to the basin axis 56 within the basin 54 and the flow channels 62 extend generally vertically within the basin 54 from a position adjacent the floor 54 toward the top surface $T_W$. That is, the first media tower 60 shown in FIGS. 10 and 10A may be rotated one hundred eighty degrees (180°) about a vertical or the first and second longitudinal axes 22, 24 such that the sludge and wastewater 10 that flows into the basin 54 from the inlet 54a flows through the first media tower 60 generally parallel to the module width $W_M$ of the individual treatment modules 42 in the first media tower 60. Accordingly, the sludge and wastewater 10 flowing through the individual treatment modules 42 typically would flow through the first media tower 60 a single time between the inlet 54a and the outlet 54b in this alternative configuration. Accordingly, in this alternative configuration, the sludge and wastewater 10 is generally exposed to the surfaces of the treatment module 42 and the biomass growing thereon during a single flow between the inlet 54a and outlet 54b. Such a configuration is particularly applicable for an anoxic biological reactor or in an anoxic section of an overall system wherein the sludge and wastewater 10 is typically not exposed to air.

The biological treatment systems 10 utilizing the above-identified alternative configuration also preferably include pumps or mixers (not shown) that urge the sludge and wastewater 10 through the basin 54 from the inlet 54a to the outlet 54b or through the treatment modules 42. The pumps or mixers may urge the sludge and wastewater 10 through the media tower or treatment module(s) 42 in a single pass or may recirculate the sludge and wastewater 10 through the treatment module(s) 42 or media tower 60 multiple times to increase the exposure of the sludge and wastewater 10 to the biomass growing on the media surfaces. The sludge and wastewater 10 may be urged generally parallel to the basin axis 56 and/or generally vertically through the corrugated sheets 14, 18, 38 and intermediate members 30 in this alternative anoxic configuration to treat the sludge and wastewater 10. The anoxic biological reactor configuration may be utilized in combination with the aerobic systems and configurations described throughout the present application. In a combined anoxic/aerobic system, the aerobic sections are preferably separated from the anoxic sections of the system by a baffle (not shown) that limits transfer of oxygen from the aerobic sections to the anoxic sections.

Referring to FIGS. 9-10A, in the preferred embodiment, sludge and wastewater 10 flows from the inlet 54a under the base edge 60a of the media tower 60 into base gap $G_T$, flows upward through the flow channels 62 in first media tower 60 out of the top edges 60b into the tower gap $G_F$, flows downward along the front or rear face of the first media tower 60 into the base gap $G_T$, may circulate in this flow path several times and eventually flows generally parallel to the basin axis 56 to the outlet 54b. The preferred injection of air via the diffuser 82 creates turbulence and high flow sludge and wastewater 10 flow rates past the biomass growing on the first media tower 60, which generally minimizes boundary layers at the biomass-sludge and wastewater interface thus enhancing exposure of the wastewater and sludge 10 to biomass growing on the surfaces of the corrugated sheets 14, 18, 38 and the intermediate members 30. Upward flow of the wastewater and sludge 10 and injected air through the cross-corrugated sheets 14, 18, 38 and through the intermediate members 30 promotes dissolution of the oxygen from the air for treating the sludge and wastewater 10 by shearing air bubbles and reducing bubble size. The pattern of flow through the flow channels 62, which is created by the cross-corrugation pattern of the corrugated sheets 14, 18, 38 in the treatment modules 42, forces the flow of sludge and wastewater 10 back and forth through the plane of the intermediate members 30 in a serpentine manner thus enhancing the exposure of the wastewater and sludge 10 to the surfaces of the intermediate members 30 and the biomass growing thereon, which are relatively efficient in treating the sludge and wastewater 10 for removal of ammonia nitrogen.

The flow pattern of the sludge and wastewater 10 through the first media tower 60 is not limited to that described above and may flow in nearly any manner relative to the first media tower 60 that exposes the sludge and wastewater 10 to at least portions of the surfaces of the treatment modules 42 and the biomass growing thereon. For example, the air diffusers 82 may be positioned proximate front and rear surfaces of the first media tower 60 outside of the gap $G_T$ to urge the sludge and wastewater 10 upwardly proximate the front and rear surfaces of the first media tower 60, over the top edge 60b beneath the top surface $T_W$ through tower gap $G_F$, down through the flow channels 62 and into the gap $G_T$. In addition, the first media tower 60 may be positioned in the basin 54 such that the flow channels 62 extend generally parallel to the basin axis 56 such that the sludge and wastewater 10 flows from the inlet 54a, through the flow channels 62 and to the outlet 54b.

A second media tower 84 and a third media tower 86 may be positioned in the basin 54 downstream of the first media tower 60 along the basin axis 56 and have a nearly identical construction and support structure when compared to the first media tower 60. The second and third media towers 84, 86 provide additional treatment for the sludge and wastewater 10 in the basin 54, as would be apparent to one having ordinary skill in the art in view of the present disclosure. The flow through each of the first, second and third media towers 60, 84, 86 may be similar or different and is preferably comprised of one of the above-described flow patterns, as would be apparent to one having ordinary skill in the art. The biological treatment system 12 is not limited to inclusion of the second media tower 84 and third media tower 86 and may include only the first media tower 60 or may include further media towers in addition to the first, second and third media towers 60, 84, 86, depending upon a particular application.

Referring to FIGS. 1-7, to assemble the corrugated sheets 14, 18, 38 and the non-structural intermediate members 30 into the sheet block 40, the openings 30a of the intermediate member 30, which may be well-defined, regularly spaced openings in a sheet of material, openings among the loops of a fabric or textile material or thermally formed receivers on a non-structural flat sheet, are positioned over and engage the projections 34a of the second corrugated sheet 18 (FIG. 7) and the first corrugated sheet 14 (FIG. 6) is aligned with the second corrugated sheet 18. The adhesive, solvent glue or mechanical fastening is applied to the projections 34a and/or the depressions 32b and the first corrugated sheet 14 is urged onto the second corrugated sheet 18 such that the mating projections 34a are positioned in the mating depressions 32b (FIGS. 4 and 5) with the intermediate member 30 sandwiched therebetween (FIG. 6). An additional intermediate member 30 is then arranged relative to one of the additional corrugated sheets 38 such that the projections 48a extend through mating openings 30a in the intermediate member 30. Adhesive, solvent glue or mechanical fastening is applied to the projections 48a and/or the depressions 34b and the projections 48a are urged into the depressions 34b to secure the additional corrugated sheet 38 relative to the first and second corrugated sheets 14, 18 to form the sheet block 40. The additional intermediate member 30 is sandwiched between the additional corrugated sheet 38 and the second corrugated sheet 18. A plurality of additional corrugated sheets 38 and additional intermediate members 30 are then secured to the sheet block 40 until the desired block depth $D_B$ of the sheet block 40 is attained. The sheet blocks 40 are then preferably assembled into the treatment modules 42. For example, four (4) sheet blocks 40 may be assembled as is shown in FIG. 9 to construct a treatment module 42. The treatment modules 42 are preferably stabilized by securing the module frame 44 along the edges of the treatment module 42 or the module frame 44 may be omitted.

In the preferred embodiment, the individual corrugated sheets 14, 18, 38 have a sheet length $l_S$ and a sheet width $w_S$ that are both approximately four feet (4'). Accordingly, the central longitudinal corrugations 14 $L_C$, 18 $L_C$ are positioned approximately at a midpoint along a sheet length $l_S$ and the corrugated sheets 14, 18, 38 may be cut along the central longitudinal corrugations 14 $L_C$, 18 $L_C$ and at a midpoint of the sheet width $w_S$ to produce four two-foot by two-foot (2'×2') corrugated sheets (see FIG. 6). These two-foot by two-foot (2'×2') corrugated sheets may be stacked with intermediate members 30 therebetween to define a relatively compact sheet block 40 (FIG. 6). Alternatively, the corrugated sheets 14, 18, 38 may be left uncut and stacked with the intermediate members 30 therebetween to define the sheet block 40. The quantity of corrugated sheets 14, 18, 38 and the corrugation height $h_S$ of each of the sheets 14, 18, 38 generally define the block depth $D_B$ of the sheet block 40.

In addition, the corrugated sheets 14, 18, 38 may be manufactured without the projections 32a, 34a, 48a and the depressions 32b, 34b, 48b and may be secured to each other at the mating surfaces 36 in the longitudinal end corrugations 14 $L_E$, 18 $L_E$ with the intermediate members 30 therebetween. Specifically, the corrugated sheets 14, 18, 38 may be secured to each other by adhesive bonding, mechanical fastening, clamping, framing or other mounting mechanisms at the mating surfaces 36 to sandwich the intermediate members 30 therebetween.

Referring to FIGS. 8-10A, following assembly of the sheet blocks 40 and the treatment modules 42, the modules 42 are shipped to a basin 54 for stacking into the media towers 60, 84, 86. The preferred treatment module 42 has a module depth $D_M$ of four feet (4'), a module height $H_M$ of four feet (4') and a module width $W_M$ of eight feet (8'). This preferred treatment module 42 may be loaded into the bed of a truck for convenient transport to the basin 54. Alternatively, the corrugated sheets 14, 18, 38 and intermediate members 30 may be shipped to the job site and assembled at the job site, in order to reduce the volume of the components that are shipped to the site, as would be apparent to one having ordinary skill in the art upon reviewing the present disclosure through nesting of the sheets 14, 18, 38. Shipping of the sheets 14, 18, 38 and intermediate members 30 in the nested configuration may be particularly applicable when the basin 54 is located in a remote location that may be difficult to reach with common transport mechanisms and methods. However, the treatment modules 42 may have nearly any size and/or configuration or may be shipped in their assembled form to the job site, as was described above, in order to adapt to a specific basin 54 or to a specific application.

When received at the basin 54, the treatment modules 42 are stacked into the media towers 60, 84, 86 on the base supports 74 and are fixed or secured to the basin 54 by the mounting structure including the top beams 76, support cables 78 and anchors 80 or other support mechanisms that are apparent to one having ordinary skill in the art. The first, second and third media towers 60, 84, 86 may be located at nearly any position along the length of the basin 54. The air diffusers 82 are positioned within the basin 54 such that the desired flow pattern relative to the media towers 60, 84, 86 may be created by the system designer. The flow pattern within the basin 54 may be may be controlled by an operator or design engineer and modified to suit a specific application. For example, two sets of diffusers 82 may be installed with separate valving and controls to reverse the flow patterns relative to the media towers 60, 84, 86, up or down in the towers 60, 84, 86. In addition, media towers 60, 84, 86 may be moved within the basin 54 and may be removed and modified and/or additional towers may be inserted into the basin 54 to modify the treating capacity and characteristics of a particular basin 54. Further, the media towers 60, 84, 86 may be removed and replaced if they become damaged, clogged or otherwise come to the end of their useful life by unstacking the treatment modules 42 and inserting a new set of treatment modules 42 to form the media towers 60, 84, 86.

The sludge and wastewater 10 is introduced into the basin 54 through the inlet 54a and the basin 54 is filled with the sludge and wastewater 10 at least until the top surface $T_W$ is positioned above the top edge 60b to immerse the media towers 60, 84, 86 and define the tower gap $G_F$. The biomass preferably grows on surfaces of the corrugated sheets 14, 18, 38 and the intermediate members 30 to treat the sludge and wastewater 10. The air diffusers 82 are actuated to promote the desired flow pattern through the media towers 60, 84, 86 and accelerate exposure of the sludge and wastewater 10 to the surfaces of the treatment modules 42. After the sludge and wastewater 10 has been sufficiently treated, the treated sludge and wastewater 10 flow from the basin 54 through the outlet 54b, which generally maintains the sludge depth $D_W$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An assembly for supporting biomass for treating sludge or wastewater, the assembly comprising:
   a plurality of first and second corrugated sheets and an intermediate member having openings therein, the intermediate member being mounted between at least one of the plurality of first corrugated sheets and at least one of the plurality of second corrugated sheets;
   each of the first corrugated sheets having crests and valleys, the crests having peak surfaces and the valleys having trough surfaces, each of the first corrugated sheets having a plurality of projections extending outward from the peak surfaces of the crests, and a plurality of depressions formed in the trough surfaces of the valleys, the first corrugated sheets having a first longitudinal axis and a first transverse axis;
   each of the second corrugated sheets having crests and valleys, the crests having peak surfaces and the valleys having trough surfaces, each of the plurality of second corrugated sheets having a plurality of projections extending outward from the peak surfaces of the crests, and a plurality of depressions formed in the trough surfaces of the valleys, the second corrugated sheets having a second longitudinal axis and a second transverse axis; and
   the projections of the second corrugated sheets being disposed within the openings in the intermediate member and extending into mating depressions of the first corrugated sheets to retain the intermediate member between the first and second corrugated sheets and to generally define a rigid structure that supports the intermediate member.

2. The assembly of claim 1 wherein the intermediate member is a flexible fabric sheet.

3. The assembly of claim 1 wherein the intermediate member is constructed of a flexible polymer material.

4. The assembly of claim 1 wherein the projections of the second corrugated sheets are retained in the depressions of the first corrugated sheets by one of adhesive bonding, solvent bonding heat-fusion bonding and mechanical deformation of the projections in the depressions that form projection-depression couplings.

5. The assembly of claim 1 wherein the projections of the second corrugated sheets are retained in the depressions of the first corrugated sheets by mechanical retention members extending between all of the corrugated sheets of the assembly.

6. The assembly of claim 1 wherein the first and second longitudinal axes are generally positioned in a parallel orientation.

7. The assembly of claim 1 wherein the first and second corrugated sheets are generally impervious to fluid flow in a direction perpendicular to a first sheet plane defined by the first longitudinal axis and the first transverse axis and a second sheet plane defined by the second longitudinal axis and the second transverse axis.

8. The assembly of claim 1 wherein the first and second corrugated sheets have a sheet length, a sheet width and a corrugation height, the corrugation height being about one-half inch (½") to about four inches (4").

9. An assembly for supporting biomass for treating sludge or wastewater, the assembly comprising:
   a first corrugated sheet having crests and valleys, the crests having peak surfaces and the valleys having trough surfaces, the first corrugated sheet having a first longitudinal axis, the corrugations of the first corrugated sheet defining a first corrugation angle of about zero degrees (0°) to about forty-five degrees (45°) relative to the first longitudinal axis;
   a second corrugated sheet having crests and valleys, the crests having peak surfaces and the valleys having trough surfaces, the second corrugated sheet having a second longitudinal axis, the corrugations of the second corrugated sheet defining a second corrugation angle of about zero degrees (0°) to about forty-five degrees (45°) relative to the second longitudinal axis, the second corrugated sheet being mounted to the first corrugated sheet; and
   an intermediate member mounted between the first corrugated sheet and the second corrugated sheet, the intermediate member having openings therein;
   wherein the first corrugated sheet includes a plurality of projections extending outward from the peak surfaces of the crests and a plurality of depressions formed in the trough surfaces of the valleys, the second corrugated sheet includes a plurality of projections extending outward from the peak surfaces of the crests and a plurality of depressions formed in the trough surfaces of the valleys, the projections of the second corrugated sheet being positioned in mating depressions of the first corrugated sheet to mount the first corrugated sheet to the second corrugated sheet and to mount the intermediate member between the first and second corrugated sheets.

10. The assembly of claim 9 wherein the intermediate member is comprised of a sheet of synthetic polymeric material, the projections of the second corrugated sheet extend through the openings to retain the intermediate member between the first and second corrugated sheets.

11. The assembly of claim 9 further comprising:
   at least one of an adhesive and solvent glue being located at mating surfaces between the projections of the second corrugated sheet and the mating depressions of the first corrugated sheet to secure the first corrugated sheet to the second corrugated sheet and the intermediate member between the first and second corrugated sheets.

12. An assembly for supporting biomass for treating sludge or wastewater, the assembly comprising:
   a first corrugated sheet having crests and valleys, the crests having peak surfaces and the valleys having trough surfaces, the first corrugated sheet having a first longitudinal axis, the corrugations of the first corrugated sheet defining a first corrugation angle of about zero degrees (0°) to about forty-five degrees (45°) relative to the first longitudinal axis;
   a second corrugated sheet having crests and valleys, the crests having peak surfaces and the valleys having trough surfaces, the second corrugated sheet having a second longitudinal axis, the corrugations of the second corrugated sheet defining a second corrugation angle of about zero degrees (0°) to about forty-five degrees (45°) relative to the second longitudinal axis, the second corrugated sheet being mounted to the first corrugated sheet; and
   an intermediate member mounted between the first corrugated sheet and the second corrugated sheet, the intermediate member having openings therein;

wherein the first and second corrugated sheets include a top edge and a bottom edge, the corrugations of the first and second corrugated sheets being comprised of longitudinal corrugations and angled corrugations, the longitudinal corrugations being positioned at least at the top edge and the bottom edge.

13. The assembly of claim 12 wherein the angled corrugations include right-hand corrugations and left-hand corrugations, the right-hand corrugations being separated from the left-hand corrugations by central longitudinal corrugations.

14. The assembly of claim 13 wherein the longitudinal corrugations of the first and second corrugated sheets are positioned proximate to each other, the fight-hand corrugations of the first corrugated sheet are positioned proximate the left-hand corrugations of the second corrugated sheet and the left-hand corrugations of the first corrugated sheet are positioned proximate the right-hand corrugations of the second corrugated sheet.

15. A biological treatment system for at least one of removal of ammonia nitrogen from and reduction of biochemical oxygen demand of sludge and wastewater, the system comprising:
    a basin having at least one of the sludge and wastewater therein, the basin including an inlet, an outlet and a basin axis; and
    a first media tower positioned within the basin defining a tower plane being generally transverse to the basin axis, the first media tower being generally impervious to fluid flow perpendicular to the tower plane, the first media tower including a plurality of intermediate members, each intermediate member being mounted between a pair of corrugated sheets, the first media tower including a base edge and a top edge, a plurality of flow channels extending from the base edge to the top edge defined by spaces between the plurality of intermediate members and the corrugated sheets, at least one of the sludge and the wastewater that moves along each of the flow channels being exposed to at least portions of the surfaces of at least one of the corrugated sheets and surfaces of at least one of the intermediate members;
    wherein the plurality of intermediate members are comprised of flexible fabric sheets, the intermediate members having openings therein, each of the corrugated sheets having projections extending from one side and depressions formed in an opposite side, the projections being mounted in mating depressions to mount the corrugated sheets to each other and to mount the plurality of intermediate members therebetween.

* * * * *